US008047316B2

(12) United States Patent
Takami et al.

(10) Patent No.: US 8,047,316 B2
(45) Date of Patent: Nov. 1, 2011

(54) STORAGE BATTERY SYSTEM, ON-VEHICLE POWER SUPPLY SYSTEM, VEHICLE AND METHOD FOR CHARGING STORAGE BATTERY SYSTEM

(75) Inventors: Norio Takami, Yokohama (JP); Hiroki Inagaki, Kawasaki (JP); Yoshinao Tatebayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 928 days.

(21) Appl. No.: 11/688,590

(22) Filed: Mar. 20, 2007

(65) Prior Publication Data
US 2007/0284159 A1 Dec. 13, 2007

(30) Foreign Application Priority Data
Jun. 13, 2006 (JP) ................................. 2006-163668

(51) Int. Cl.
*B60K 6/28* (2007.10)
(52) U.S. Cl. ..................................... 180/65.29
(58) Field of Classification Search ................ 180/65.1, 180/65.21, 65.22, 65.29; 903/907; 701/22; 429/9, 150; 320/104
See application file for complete search history.

(56) References Cited

U.S. PATENT DOCUMENTS

| | | | | |
|---|---|---|---|---|
| 3,652,917 A * | 3/1972 | Biggs | ............................ | 320/128 |
| 3,673,379 A * | 6/1972 | Eversull | ......................... | 219/202 |
| 3,843,918 A * | 10/1974 | Rhyne | ........................... | 320/160 |
| 3,904,947 A * | 9/1975 | Crews | ............................ | 320/138 |
| 4,025,860 A * | 5/1977 | Shibata et al. | ................. | 320/126 |
| 4,316,132 A * | 2/1982 | Geppert | ......................... | 318/723 |
| 4,608,627 A * | 8/1986 | Holt | ............................... | 363/131 |
| 4,688,160 A * | 8/1987 | Fraidlin | ........................ | 363/21.02 |
| 4,806,842 A * | 2/1989 | Bittner | ............................ | 323/222 |
| 4,862,013 A * | 8/1989 | Konopka | ........................ | 327/538 |
| 5,318,142 A * | 6/1994 | Bates et al. | ................ | 180/65.245 |
| 5,656,916 A * | 8/1997 | Hotta | ............................. | 320/160 |
| 5,788,597 A * | 8/1998 | Boll et al. | ........................ | 477/4 |
| 5,828,201 A * | 10/1998 | Hoffman et al. | ............... | 320/104 |
| 5,883,496 A * | 3/1999 | Esaki et al. | ..................... | 320/132 |
| 5,905,360 A * | 5/1999 | Ukita | ............................. | 320/118 |
| 6,132,902 A * | 10/2000 | Miyasaka | ....................... | 429/224 |
| 6,617,076 B2 * | 9/2003 | Wataru et al. | .................. | 429/250 |
| 7,217,474 B2 * | 5/2007 | Yamada et al. | ............. | 429/231.1 |
| 2001/0052758 A1 | 12/2001 | Odaohhara | | |
| 2006/0068272 A1 | 3/2006 | Takami et al. | | |

FOREIGN PATENT DOCUMENTS

| | | |
|---|---|---|
| EP | 1 220 349 A1 | 7/2002 |
| EP | 1 315 227 A2 | 5/2003 |
| JP | 2003-134689 | 5/2003 |
| JP | 2004-48913 | 2/2004 |
| JP | 2004-289892 | 10/2004 |
| WO | WO 2005/027345 A1 | 3/2005 |

* cited by examiner

*Primary Examiner* — Frank Vanaman
(74) *Attorney, Agent, or Firm* — Oblon, Spivak, McClelland, Maier & Neustadt, L.L.P.

(57) ABSTRACT

A storage battery system includes a battery module A with a first nonaqueous electrolyte battery including a negative-electrode material which has an average grain size of 2 μm or more and is used to occlude and discharge lithium ions, a battery module B with a second nonaqueous electrolyte battery set at a lithium-ion-occluding potential of 0.4V (vs.Li/Li) or more, and including a negative-electrode material which has an average grain size of primary particles of 1 μm or less and is used to occlude lithium ions, and a controller configured to intermittently connect the module A to the module B to intermittently supply power from the module A to the module B to set a charge state and a discharge depth of the second nonaqueous electrolyte battery within a range of 10 to 90%, when no power is supplied to the module B at least from an outside.

13 Claims, 9 Drawing Sheets

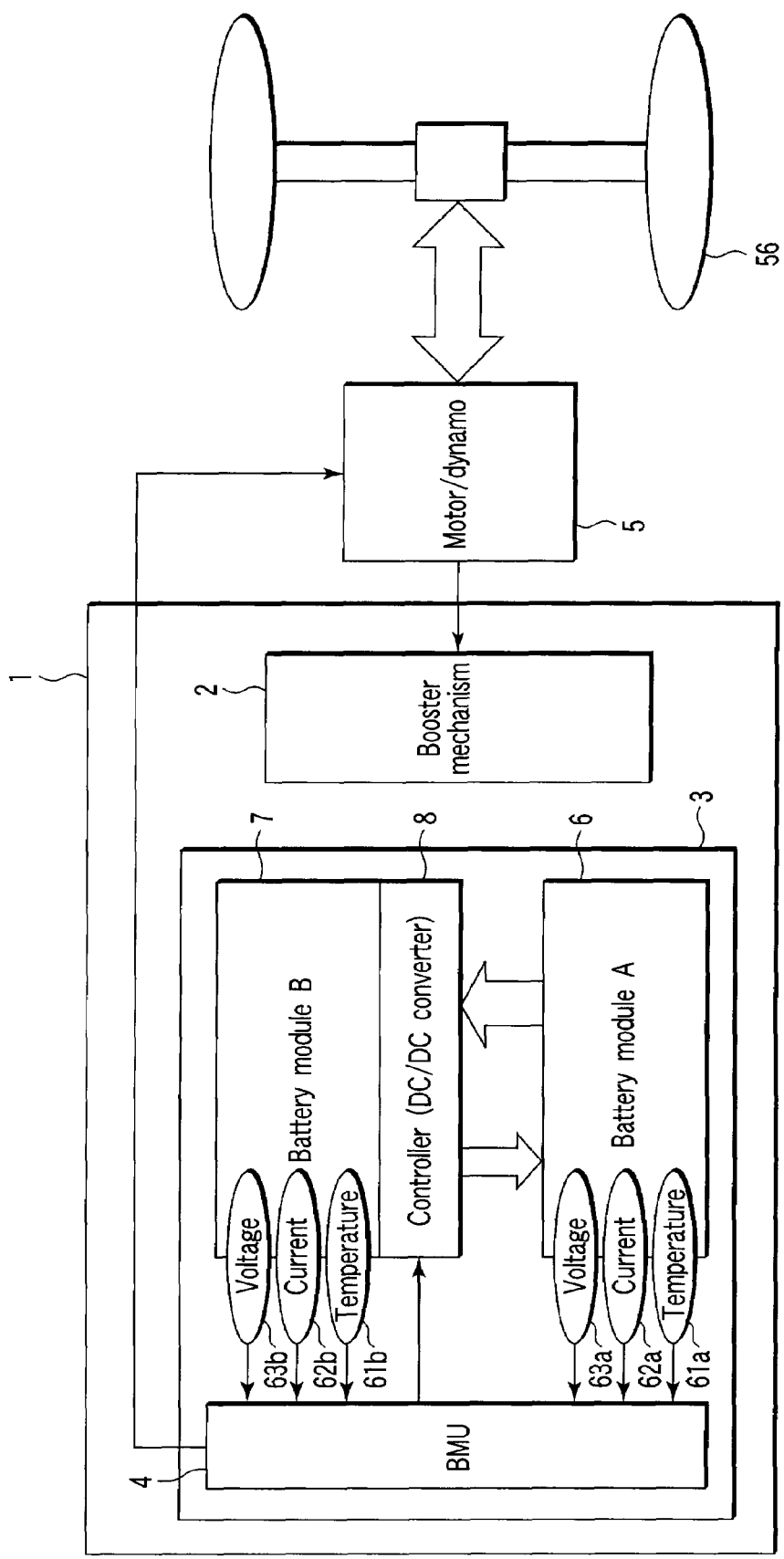
F I G. 1

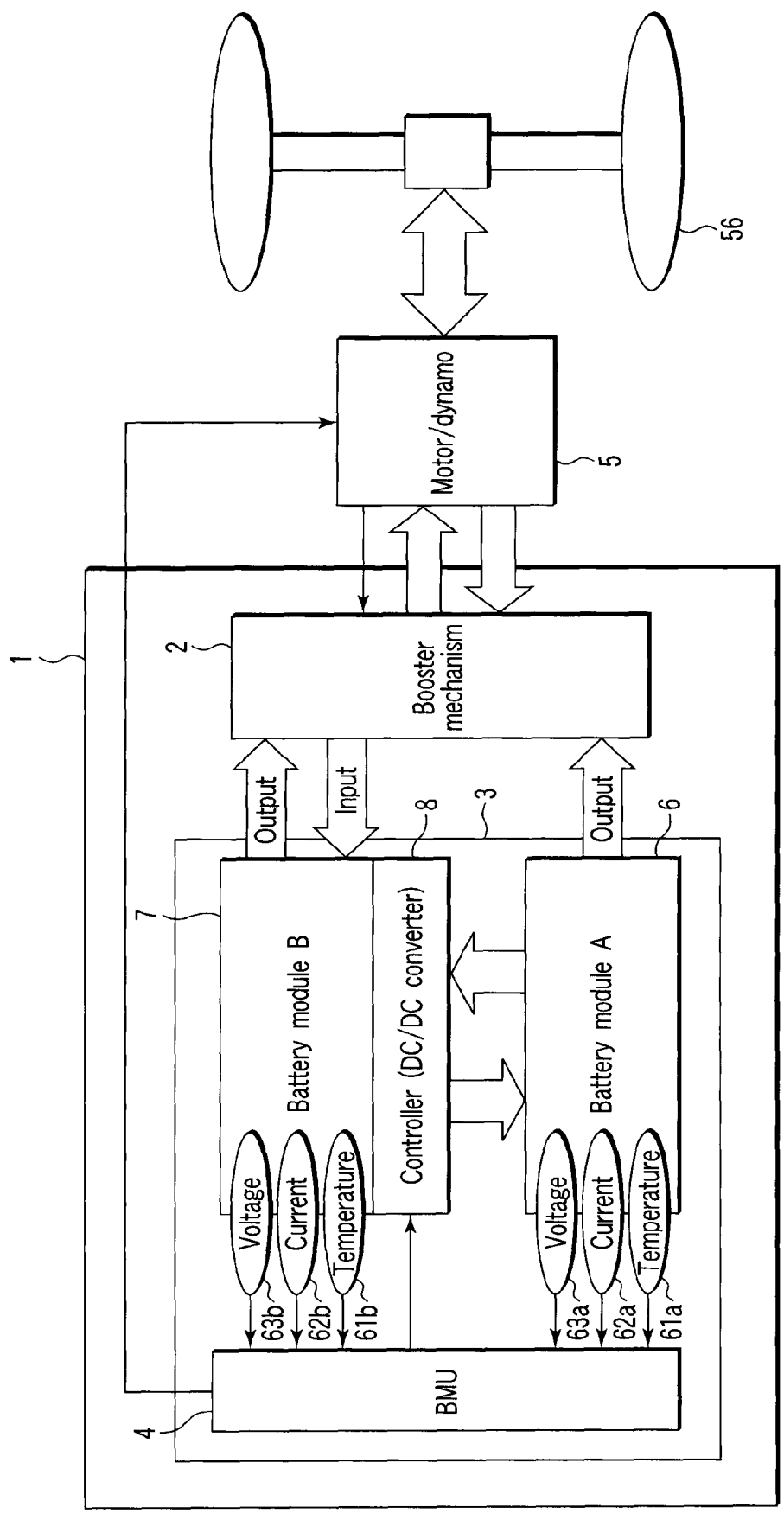
F I G. 2

STORAGE BATTERY SYSTEM, ON-VEHICLE POWER SUPPLY SYSTEM, VEHICLE AND METHOD FOR CHARGING STORAGE BATTERY SYSTEM

CROSS-REFERENCE TO RELATED APPLICATIONS

This application is based upon and claims the benefit of priority from prior Japanese Patent Application No. 2006-163668, filed Jun. 13, 2006, the entire contents of which are incorporated herein by reference.

BACKGROUND OF THE INVENTION

1. Field of the Invention

The present invention relates to a storage battery system suitable for, for example, vehicles, bicycles, trams, elevators, aerogenerators and emergency power supplies, etc., which aim to enhance energy efficiency, and also relates to an on-vehicle power supply system and vehicle provided with such a storage battery system.

2. Description of the Related Art

In recent years, hybrid vehicles, bicycles, trams, elevators and aerogenerators, etc., which are provided with a battery, have been proposed, and some of them have been put into practice, to effectively use energy, in particular, regenerative energy as environmental measures. Secondary batteries, which have been proposed as backup power supplies for an emergency, such as a blackout, and have been put to into practice and installed in vehicles so far, include, for example, lead storage batteries and nickel hydride batteries.

However, nickel hydride batteries installed in hybrid vehicles, for example, have the problem that they suddenly generate heat during high-power outputting or fast charging (regenerative charging), and their thermal degradation is very conspicuous. Furthermore, lead storage batteries used as emergency power supplies have a low weight energy density and hence heavy weight, therefore, involve constraints on their installation place.

Hybrid vehicles using a large-capacity capacitor have now been developed. Compared to secondary batteries, capacitors can accumulate high power instantly, but have a very small electric capacity and hence cannot be made compact.

To solve the above problems, JPA KOKAI No. 2003-134689, for example, has proposed a high-power lithium ion battery. While lithium ion batteries can generate high voltage and be made light, and hence have a high energy density, they use a carbon material as the material of their negative electrodes. Accordingly, their cycle lives will degrade if fast charging, such as energy regeneration, is performed. This being so, when low power is input to the batteries, they cannot efficiently accumulate regenerative energy. Further, if lithium ion batteries are made into high-power ones, their inherent high energy density is significantly reduced to thereby reduce their discharge capacity. Accordingly, the travel distance of, for example, electric vehicles is inevitably shortened. Furthermore, for hybrid vehicles, there is a demand for enhancing the energy regenerative performance during braking and the acceleration performance, and also a demand for increasing the travel distance during motor driving (EV driving). However, it is difficult to satisfy both the enhancement of energy regenerative performance and acceleration performance, and the traveling performance during motor driving (EV driving).

JP-A 2004-289892(Kokai) has proposed a hybrid vehicle with a storage battery system as an on-vehicle power supply. The storage battery system includes main and sub battery modules. The sub battery module accumulates regenerative current supplied by a motor or dynamo, and the main battery module is charged with the power accumulated by the sub battery module. However, in this storage battery system, the active material of the negative electrode is low in the rate of occluding and discharging ions, and hence efficient charging cannot be achieved during fast charging, such as regenerative charging.

BRIEF SUMMARY OF THE INVENTION

It is an object of the invention to provide a long-life storage battery system capable of efficient charging during fast charging, such as regenerative charging, and capable of discharging for a long time during a low-load operation, and also to provide an on-vehicle power supply system and vehicle provided with such a storage battery system, and a charging method for such a storage battery system.

In accordance with a first aspect of the invention, there is provided a storage battery system comprising: a battery module A with a first nonaqueous electrolyte battery including a negative-electrode material which has an average grain size of 2 µm or more and is used to occlude and discharge lithium ions; a battery module B with a second nonaqueous electrolyte battery set at a lithium-ion-occluding potential of 0.4V (vs.Li/Li) or more, and including a negative-electrode material which has an average grain size of primary particles of 1 µm or less and is used to occlude lithium ions; and a controller configured to intermittently connect the battery module A to the battery module B to intermittently supply power from the battery module A to the battery module B to set state of charge (SOC) and a depth of discharge (DOD) of the second nonaqueous electrolyte battery within a range of 10 to 90%, when no power is supplied to the battery module B at least from an external source.

In accordance with a second aspect of the invention, there is provided an on-vehicle power supply system comprising: a storage battery system; and a controller, the storage battery system including: a battery module A with a first nonaqueous electrolyte battery including a negative-electrode material which has an average grain size of 2 µm or more and is used to occlude and discharge lithium ions; and a battery module B with a second nonaqueous electrolyte battery set at a lithium-ion-occluding potential of 0.4V (vs.Li/Li) or more, and including a negative-electrode material which has an average grain size of primary particles of 1 µm or less and is used to occlude lithium ions, wherein the controller intermittently connects the battery module A to the battery module B to intermittently supply power from the battery module A to the battery module B to set state of charge (SOC) and a depth of discharge (DOD) of the second nonaqueous electrolyte battery within a range of 10 to 90%, when no power is supplied to the storage battery system at least from a motor or dynamo installed in a vehicle.

In accordance with a third aspect of the invention, there is provided an on-vehicle power supply system comprising: a storage battery system; and a controller, the storage battery system including: a battery module A with a first nonaqueous electrolyte battery including a negative-electrode material which has an average grain size of 2 µm or more and is used to occlude and discharge lithium ions; and a battery module B with a second nonaqueous electrolyte battery set at a lithium-ion-occluding potential of 0.4V (vs.Li/Li) or more, and including a negative-electrode material which has an average grain size of primary particles of 1 µm or less and is used to occlude lithium ions, wherein when power is supplied to the storage battery system from a motor or dynamo installed in a vehicle, the controller intermittently causes the power from the motor or dynamo to be supplied to the battery module B, and causes the battery module A to supply power to the motor, the power from the battery module A being lower than the power supplied to the battery module B.

In accordance with a fourth aspect of the invention, there is provided a vehicle provided with one of the above-described on-vehicle power supply systems.

In accordance with a fifth aspect of the invention, there is provided a method of charging a storage battery system, the storage battery system including: a battery module A with a first nonaqueous electrolyte battery including a negative-electrode material which has an average grain size of 2 μm or more and is used to occlude and discharge lithium ions; and a battery module B with a second nonaqueous electrolyte battery set at a lithium-ion-occluding potential of 0.4V (vs.Li/Li) or more, and including a negative-electrode material which has an average grain size of primary particles of 1 μm or less and is used to occlude lithium ions, the method comprising: intermittently connecting the battery module A to the battery module B to intermittently supply power from the battery module A to the battery module B to set state of charge (SOC) and a depth of discharge (DOD) of the second nonaqueous electrolyte battery within a range of 10 to 90%, when no power is supplied to the battery module B at least from an outside.

BRIEF DESCRIPTION OF THE SEVERAL VIEWS OF THE DRAWINGS

FIG. 1 is a schematic plan view illustrating the states of a storage battery system and on-vehicle power supply system according to the invention, assumed during the stop of a motor/dynamo;

FIG. 2 is a schematic plan view illustrating the states of the storage battery system and on-vehicle power supply system according to the invention, assumed during the operation of the motor/dynamo;

DETAILED DESCRIPTION OF THE INVENTION

Figure 3:
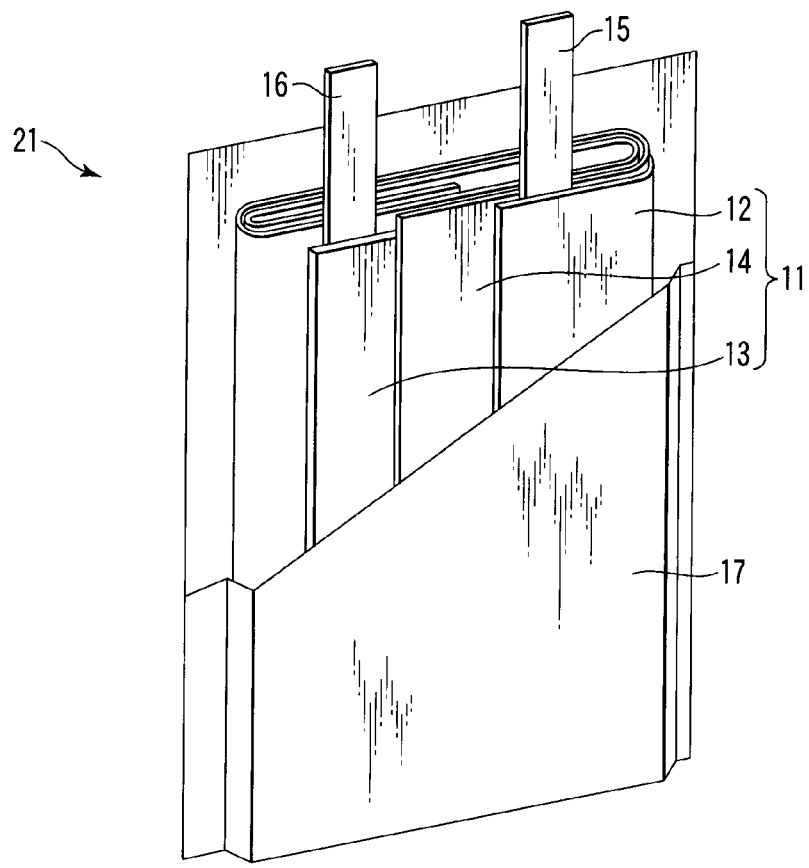
FIG. 3 is a perspective view partly broken, illustrating a unit cell included in a battery module.

Preferable embodiments of the invention will be described with reference to the accompanying drawings.

In a storage battery system 1 of the invention, in a first nonaqueous electrolyte battery 6 included in a battery module A, its negative electrode is formed of an active material having an average grain size of 2 μm or more and capable of occluding a large number of lithium ions. Therefore, the battery 6 has a low lithium-ion occluding/discharging rate, but can store a large number of lithium ions. This being so, if the battery 6 serves as the main battery module of the storage battery system 1 of the invention under a low-load driving condition, the storage battery system 1 can operate for a long time.

On the other hand, a second nonaqueous electrolyte battery 7 included in a battery module B is set at an electrical potential of 0.4V (vs.Li/Li) or more for occluding lithium ions. Therefore, the battery 7 has a low energy density, but deposition of lithium metal does not easily occur during fast charging. Further, since the active material of the negative electrode of the battery 7 has an average grain size of primary particles of 1 μm or less, the lithium ion occlusion/discharge rate of the battery 7 is high. Accordingly, if the battery 7 serves as the main power supply of the storage battery system 1 of the invention, the storage battery system 1 exhibits high output/input performance under a driving condition that requires high output power or during power regeneration that requires high input power.

When no power is supplied from the outside to the storage battery system 1 (e.g., when the motor/dynamo of an on-vehicle supply power system is stopped), a controller 4 causes the battery modules A and B to be intermittently connected and to intermittently supply power from the battery module A to the battery module B. As a result, the SOC and DOD of the second nonaqueous electrolyte battery 7 are adjusted to an appropriate range of 10 to 90%, with the result that high output/input performance can be maintained and hence the cycle life of the battery module B can be extended. Namely, by intermittently supplying power to the battery module B, the battery module B can be set to an appropriate charge-state range, thereby suppressing an increase in the resistance of the battery module B in a long inoperative state, and reliably maintaining the high output/input performance over a long period.

Defined here the "intermittent power supply" is a power supply in which the electrically disconnected state (rest state) of the battery modules A and B and the electrically connected state (charging state) thereof are switched in accordance with the SOC of the battery module B, instead of always electrically connecting the battery modules A and B, thereby adjusting the length of the electrically disconnected period (rest period). For instance, when the SOC of the battery module B is high, the electrically disconnected period is lengthened, whereas when it is low, the electrically disconnected period is shortened. It is desirable to perform charging by constant voltage control from the battery module A to the battery module B. This power supply scheme enables charging to be finished in a short time.

In contrast, if power is continuously supplied without the electrically disconnected period, the internal resistance of the battery module B is gradually increased, thereby degrading the output/input performance. This is because electrolytic solution is subjected to oxidation decomposition reaction on the surface of the positive electrode, whereby an oxide film of high resistance grows on the positive electrode.

It is preferable that the battery modules A and B are electrically connected 1 to 60 times per 30 days to supply power from the battery module A to the battery module B so that the SOC of the battery module B is adjusted to the range of 10 to 90%. Namely, it is sufficient if electrical connection is executed a preset number of times per 30 days to intermittently supply power from the battery module A to the battery module B (i.e., to intermittently charge the battery module B) by the amount of electricity self-discharged from the battery module B, said preset number falling within a range of 1 to 60 times. If the battery modules A and B are electrically connected at a frequency higher than the appropriate range, the electricity storage life of the battery module B is reduced, since oxidation decomposition of electrolytic solution occurs on the positive electrode to thereby increase the resistance of the positive electrode and significantly reduce the output/input performance. A more preferable frequency of electrical connection is 10 to 40 times per 30 days. In contrast, if the battery modules A and B are electrically connected at a frequency lower than the appropriate range, the amount of self discharge is increased and insufficient power supplement may occur.

A more preferable range of charge state is 20 to 80%. If the charge state is kept in this range, the resistance of the battery can be further reduced, and hence the output/input performance of the storage battery system can be maintained at high level.

It is preferable to supply power from the battery module B to the battery module A (i.e., charge the battery module A) when the charge state of the battery module B falls within the range of 50 to 100%. By supplying power to the battery module A when the charge state of the battery module B falls within the range of 50 to 100%, the output/input performance of the storage battery system can be maintained at high level. Namely, the charge state of the battery module B is prevented from excessive increase. A more preferable range of charge state is 60 to 80%. It is also preferable to employ constant-current/constant-voltage control as a scheme for supplying power from the battery module B to the battery module A.

For nonaqueous electrolyte batteries, there are various charging schemes, such as constant current charging, constant voltage charging, and constant current and constant voltage charging, etc. The "constant current charging (CC charging)" means a charging scheme utilizing a particular current. The "constant voltage charging (CV charging)" means a charging scheme utilizing a particular voltage. Similarly, the "constant current and constant voltage charging (CCCV charging)" means a charging scheme acquired by combining CC charging and CV charging. During CCCV charging, firstly, CC charging is performed until a particular voltage is reached, and then CV charging is performed for a preset period using the particular voltage. In the invention, it is desirable to employ CV charging when power is supplied from the battery module A to the battery module B. Since the battery module B serves as a main power supply when device driving that requires high output or power regeneration that requires high input is performed, it is necessary to perform charging at a high charging rate in a short time. In contrast, to supply power from the battery module B to the battery module A, it is desirable to employ CCCV charging. This is because the battery module A serves as a main power supply under a low-load driving condition, and hence should be charged safely so as not to degrade its cycle life.

In an on-vehicle power supply system, when power is supplied from a motor or dynamo 5 to the storage battery system, the battery module B is supplied with power from the motor/dynamo 5, and the battery module A supplies power lower than the first-mentioned one to the motor 5, as shown in FIG. 2. The supply of power to the battery module B is performed to efficiently accumulate braking energy therein. Depending upon whether the vehicle performs accelerated traveling or constant traveling, the level (W) of supplied power is varied. This is because the level of power supplied from the battery module A to the motor 5 during constant traveling is lower than that of power supplied to the battery module B during acceleration.

It is preferable that the active material of the negative electrode of the second nonaqueous electrolyte battery (battery module B) contains a metal oxide containing titanium. Further, it is preferable that the metal oxide containing titanium contains a spinel-type lithium titanium oxide. The active material of the negative electrode of the second nonaqueous electrolyte battery, which is set to a potential of 0.4V (vs.Li/Li) or more for occluding lithium ions with an average grain size of primary particles of 1 μm or less, preferably contains a metal oxide containing titanium, and more preferably contains a spinel-type lithium titanium oxide. The second nonaqueous electrolyte battery exhibits high output/input performance by virtue of fine primary particles with the average grain size of 1 μm or less, and also exhibits an excellent long cycle-life performance since the degree of decomposition of electrolytic solution due to charge/discharge cycle or a change in electrode volume is very small.

Further, it is preferable that the active material of the negative electrode of the first nonaqueous electrolyte battery (battery module A) contains a carbon material with an average grain size of 1 μm or more, and a lithium alloy and metal alloy for occluding and discharging lithium ions. It is more preferable that the carbon material contained in the first nonaqueous electrolyte battery contains graphite particles acquired using natural graphite as a raw material. Since thus, the active material of the negative electrode of the first nonaqueous electrolyte battery (battery module A) contains a carbon material with an average grain size of 1 μm or more, a lithium alloy and a metal alloy, the rate of occluding/discharging lithium ions is low, and a large amount of lithium ions can be extracted during a low-load operation. Further, since the potential for occluding lithium ions is low, the first nonaqueous electrolyte battery can generate high voltage and hence have a higher energy density than the second nonaqueous electrolyte battery (battery module B). It is more preferable that the carbon material contains graphite particles acquired using natural graphite as a raw material.

Figure 7:
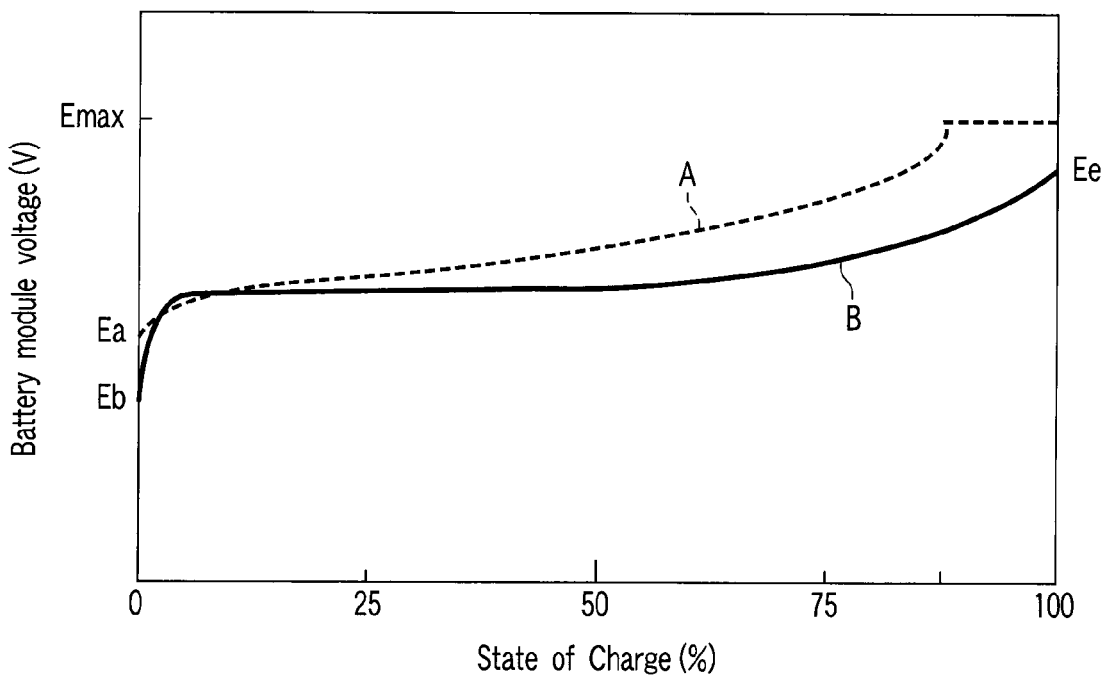
FIG. 7 is a graph illustrating battery-voltage/SOC characteristic curves unique to a battery module A and battery module B.

FIG. 7 is a graph illustrating battery-voltage/SOC characteristic curves unique to a battery module A and battery module B. In FIG. 7, curve (broken line) A indicates the characteristic of the battery module A, and curve (solid line) B indicates the characteristic of the battery module B. As can be understood from FIG. 7, the battery module A has a characteristic suitable for CCCV charging. Namely, the battery module A is firstly charged with a particular current (CC charging). When the voltage of the cell A reaches a particular voltage Emax, CC charging is switched to CV charging, and CV charging is executed for a preset period with the battery voltage kept Emax. The charging period is controlled by the built-in timer of the controller 4. The voltage Vmax is a maximum value within the range in which the battery module A is prevented from excessive charging. On the other hand, the battery module B has a characteristic suitable for CC or CV charging. Namely, the battery module B is charged with the particular current (CC charging), and reaches a voltage Ee when the charging is finished (SOC 100%). The final voltage Ee of the battery module B is, for example, 238V.

Various embodiments of the invention will be described in detail with reference to the accompanying drawings.

First Embodiment

As shown in FIGS. 1 and 2, the storage battery system 1 of the first embodiment comprises a booster mechanism 2, battery modules A and B connected to the booster mechanism 2, and a battery control unit (BMU) 4 connected to the battery modules A and B. The battery module B has a module, in which a plurality of single cells formed of thin nonaqueous electrolyte secondary batteries 7 are connected parallel to each other or in series. The battery module A is intermittently connected to the battery module B parallel to each other via a controller 8, and controls the amounts of current input to and output from the battery module B. The controller B contains a DC/DC converter, and performs constant voltage control to enable power to be supplied from the battery module A to the battery module B.

FIG. 3 shows an example of a unit cell 21 as a nonaqueous electrolyte battery. An electrode group 11 has a flat, spiral structure formed of a positive electrode 12, negative electrode 13 and separator 14 interposed therebetween. The electrode group 11 is formed by winding the positive electrode 12 and negative electrode 13 with the separator 14 interposed therebetween, and then subjecting the resultant structure to thermal pressing. Alternatively, the positive electrode 12, negative electrode 13 and separator 14 may be formed integral using an adhesive polymer. A band-shaped positive terminal 15 is electrically connected to the positive electrode 12. Similarly, a band-shaped negative terminal 16 is electrically connected to the negative electrode 13. The electrode group 11 is contained in a laminate-film container 17 with the ends of the positive and negative terminals 15 and 16 made to protrude from the container. The laminate film container 17 is sealed by a heat seal.

Figure 4:
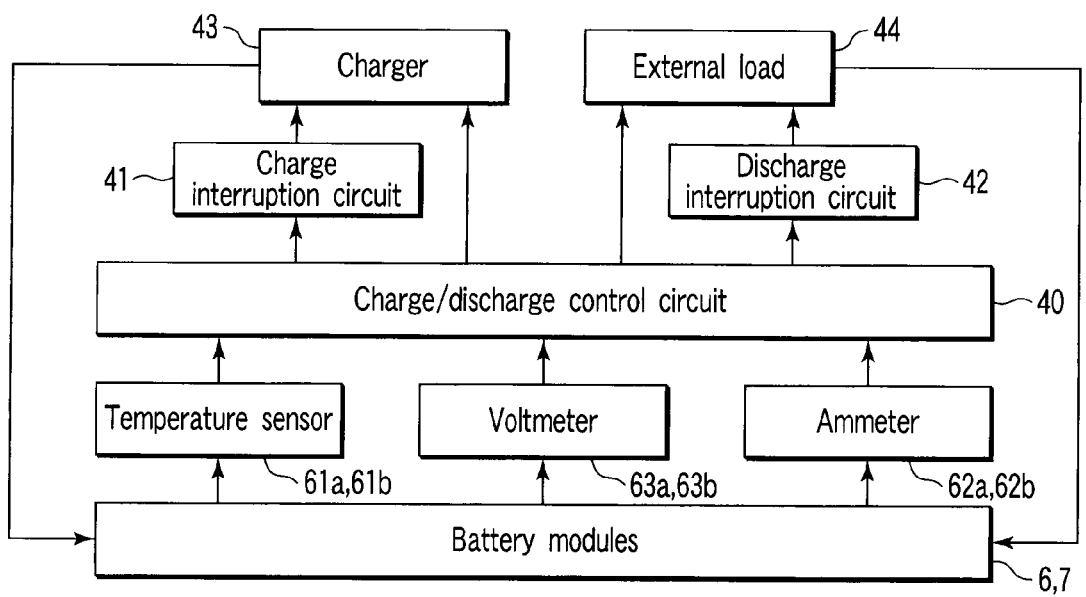
FIG. 4 is a block diagram illustrating in detail the relationship between the battery module and a battery control unit.

As shown in FIG. 4, the battery control unit (BMU) 4 comprises temperature sensors 61a and 61b for measuring the temperatures of the battery modules A and B, respectively, voltmeters 63a and 63b for measuring the voltages of the battery modules A and B, respectively, ammeters 62a and 62b for measuring the currents of the battery modules A and B, respectively, a charge/discharge control circuit 40, charge interruption circuit 41 and discharge interruption circuit 42. The temperature sensors 61 and 62 may be formed of thermo couples or thermistors.

The charge/discharge control circuit 40 receives measurement signals from the temperature sensors 61a and 61b, voltmeters 63a and 63b and ammeters 62a and 62b. Based on the input signals the control circuit 40 computes the present charge capacity, and supplies signals to the charge interruption circuit 41 and discharge interruption circuit 42 for setting a certain state of charge (SOC), thereby controlling the charge/discharge of the nonaqueous electrolyte batteries 6 and 7 of the battery modules A and B.

The storage battery system 1 constructed as above can be connected to a DC motor/dynamo 5 as an external load incorporated in, for example, a hybrid vehicle or electric vehicle. In this case, the dynamo connected to the DC motor is connected to the booster mechanism 2 of the storage battery system. The booster mechanism 2 serves as a charger for supplying regenerative power at least to the battery module B. On the other hand, the DC motor 5 is connected to the BMU 4 of the storage battery system 1. As a result, the output of the battery modules A and B supplied to the DC motor can be controlled in accordance with signals from the charge/discharge control circuit 40 and discharge interruption circuit 42. Further, the controller 8 can control the battery module B to supply power from the battery module B to the battery module A to charge it when the state of charge (SOC) of the battery module B falls within the range of 50 to 100%. Further, the battery module A can be directly charged by an external charger 71 and/or power supply 73 as in on-vehicle power supply systems 50A to 50F incorporated in the plug-in hybrid vehicles shown in FIGS. 11, 13 and 15.

It is preferable to intermittently supply power from the battery module A to the battery module B by constant-voltage control, to thereby adjust the SOC of the battery module B within a range of 10 to 90%, and more preferably, a range of 40 to 60%. In particular, when the on-vehicle power supply system is stopped (for example, when the motor and dynamo are stopped during long-time parking of the vehicle), the battery module A charges the battery module B by the amount of electricity corresponding to the self-discharge of the battery module B. Further, when the battery module B instantly discharges high power to the outside (during, for example, acceleration of the vehicle), and the SOC is suddenly reduced to 40% or less, the battery module A supplies power to the battery module B to set the SOC of the battery module B within the range of 40 to 60%. At this time, it is preferable that the supply of power is performed rapidly using constant-voltage control. More specifically, when the state of charge (SOC) of the battery module B drops to 40% or lower, the MBU 4 operates to have a power supply from the battery module A to the battery module B by the constant-voltage control. It should be noted that various types of external power sources can be connected to the battery module B to supply power thereto. The battery module B is provided with a power supply directly from an external power source. Further, the battery module A is provided with a power supply from the external power source via the battery module B.

Although the storage battery systems and on-vehicle power supply systems shown in FIGS. 1 and 2 do not incorporate a cooling fan, a cooling fan may be employed to cool the battery modules. Further, an AC motor may be used instead of the DC motor. In the case of using an AC motor, a rectifier is needed.

A description will now be given of the negative and positive electrodes, separator, nonaqueous electrolyte and container of each nonaqueous electrolyte battery.

1) Negative Electrode

A negative electrode comprises a negative collector, and a negative-electrode layer provided on one or both sides of the collector and containing a negative-electrode active material, conductive agent and binding agent.

It is desirable to use, as the negative-electrode active material of each second nonaqueous electrolyte battery 7 of the battery module B, a metal oxide, metal sulfide, metal nitride or metal alloy, which have an average grain size of primary particles of 1 µm or less and can occlude lithium ions within a range of 0.4V to 3V (vs.Li/Li+). In particular, it is preferable to use a negative-electrode material containing a lithium titanium complex oxide. As the lithium titanium complex oxide, lithium titanate (e.g., spinel-type $Li_{4+x}Ti_5O_{12}$, x: $-1 \leq x \leq 3$, and preferably, $0 < x < 1$) can be used. In view of cycle life, lithium titanate is preferable. This is because the lithium occluding potential of lithium titanate is about 1.5V, and is electrochemically very stable material with respect to an aluminum foil collector or aluminum alloy foil collector.

As well as the above-mentioned spinel-type lithium titanate, a ramsdellite-type lithium titanate, such as $Li_{2+x}Ti_3O_7$ (x: $-1 \leq x \leq 3$), can be used. Hereinafter, the spinel-type lithium titanate and ramsdellite-type lithium titanate will be referred to as "lithium titanium oxides." Lithium titanium complex oxides include, as well as lithium titanium oxides, titanium-based oxides that do not contain lithium. Lithium titanium oxides include, for example, a metal complex oxide containing at least one element selected from the group of $TiO_2$, Ti, P, V, Sn, Cu, Ni and Fe. It is preferable that $TiO_2$ is of an anatase type and has low crystalline properties acquired at a thermal treatment temperature of 300 to 500° C. As a metal complex oxide containing at least one element selected from the group of Ti, P, V, Sn, Cu, Ni and Fe, $TiO_2-P_2O_5$, $TiO_2-V_2O_5$, $TiO_2-P_2O_5-SnO_2$, and $TiO_2-P_2O_5-MeO$ (Me is at least one metal selected from the group consisting of Cu, Ni and Fe), etc., can be exemplified. It is preferable that the metal complex oxide has low crystalline properties, and has a microstructure in which a crystalline phase and amorphous phase are mixed, or only an amorphous phase exists. By virtue of this microstructure, the cycle performance can be significantly enhanced. In particular, a metal complex oxide containing a lithium titanium oxide and at least one element selected from the group of Ti, P, V, Sn, Cu, Ni and Fe is preferable.

The negative-electrode active material may contain a material other than a lithium titanium complex oxide. This material is, for example, a carbonaceous material that can occlude and discharge lithium.

The average grain size of the primary particles of the negative-electrode material is 1 μm or less. The use of a negative-electrode material with an average grain size of 1 μm or less enhances the cycle performance. In particular, this effect is conspicuous during rapid charging and high-output discharging. Concerning, for example, a negative-electrode for occluding and discharging lithium ions, the reason why the effect is conspicuous is that the finer, the grain size, the shorter the diffusion distances of lithium ions in the active material and the greater the specific surface of each particle. More preferably, the average grain size of the negative-electrode material is 0.3 μm or less. However, when the average grain size of the negative-electrode material is small, aggregation of particles may easily occur, which may involve a reduction in the uniformity of the particle size of the negative-electrode active material. In light of this, it is desirable to set its lower limit to 0.001 μm.

Concerning primary particles of a negative-electrode active material with an average grain size of 1 μm or less, it is desirable to subject a row material for the active material to synthesis to thereby prepare, as an active material precursor, powder with a diameter of 1 μm or less. The negative-electrode active material is acquired by crushing up the powder acquired after sintering into 1 μm or less, using a crusher, such as a ball mill or jet mill.

The grain size of primary particles of the negative-electrode active material is measured by a laser-diffraction-type grain-size-distribution measuring apparatus (SALD-300 made by Shimazu Corporation). Firstly, as a pretreatment, a aggregated sample is diffused in the following manner. That is, a sample of about 0.1 g, an interfacial active material and distilled water of 1-2 mL are fed into a beaker and sufficiently agitated. After that, the resultant solution is injected into an agitation vessel, where it is subjected to light-intensity-distribution measurement performed 64 times at intervals of 2 seconds, thereby acquiring grain-size distribution data. Thus, measurement results, such as a grain-size distribution and average grain size of the primary particles, are obtained.

It is preferable that the negative collector is formed of aluminum foil or aluminum alloy foil. It is also preferable that the average crystal grain size of the aluminum foil or aluminum alloy foil is 50 μm or less, and more preferably, 10 μm or less. The smaller the average crystal grain size, the stronger the chemical and physical strengths. However, from the fact that a fine crystal structure is desirable to acquire excellent conductivity, it is desirable to set the lower limit of the average crystal grain size to 0.01 μm.

When the average crystal grain size of the aluminum foil or aluminum alloy foil is set to 50 μm or less, the strength of the negative collector can be significantly increased. The greater the strength of the negative collector, the greater the physical and chemical resistances of the collector, and hence the less the breakage of the collector. In particular, degradation of the collector due to dissolution/corrosion, which is conspicuous in a long excessive-discharge cycle at a high temperature (40° C. and above), can be suppressed to thereby suppress an increase in electrode resistance. Suppression in an increase in electrode resistance reduces the Joule heat, thereby suppressing heat generation by the electrodes.

Further, by virtue of an increase in the strength of the negative collector, it is not broken even when high pressure is exerted thereon. This enhances the capacity density of the negative electrodes.

In general, when pressing the negative electrode, the smaller the average grain size of the negative-electrode active material, the greater the load on the negative collector. If the negative collector is formed of an aluminum foil or aluminum alloy foil with an average crystal grain size of 50 μm or less, it can wear a great pressing force exerted thereon by virtue of the strength of the negative-electrode material with an average grain size of 1 μm or less. As a result, breakage of the negative collector during pressing can be avoided.

Further, since a large number of negative electrodes can be integrated, the thermal conductivity of the electrodes can be enhanced, and hence the heat-releasing property of the electrodes be enhanced. Furthermore, the synergistic effect of the suppression of the heat generation of the battery, and the enhancement of the heat-releasing property of the electrodes result in the suppression of increases in the temperature of the battery.

Aluminum foil or aluminum alloy foil with an average crystal grain size of 50 μm or less is influenced in a complicated manner by many factors, such as their composition, impurities, process conditions, thermal treatment history, and heating and cooling conditions of annealing. Accordingly, during the manufacturing process, the crystal grain size of the negative collector is adjusted in light of all the above-mentioned factors. The negative collector may be produced using PACAL21 (product name) of Nippon Foil Mig. Co., Ltd.

Specifically, aluminum foil with the average crystal grain size of 50 μm or less can be produced by annealing aluminum foil with an average crystal grain size of 90 μm at 50 to 250° C., and cooling the resultant material to the room temperature.

The average crystal grain size of aluminum and an aluminum alloy is measured as follows:

Firstly, the texture of the surface of a negative collector is observed using a metallographic microscope to measure the number "n" of crystal grains existing in a viewing field of 1

μm×1 μm, thereby computing an average crystal grain area S ($\mu m^2$) using the following equation (1):

$$S=(1\times 10^6)/n \tag{1}$$

where ($1\times 10^6$) is a viewing field area of 1 μm×1 μm ($\mu m^2$), and n is the number of crystal grains.

An average crystal grain size d (μm) is computed using the acquired average crystal grain area S and the following equation (2):

$$d=2(S/\pi)^{1/2} \tag{2}$$

Such average-crystal-grain-diameter computation is performed concerning five portions (5 viewing fields), and the average of the resultant values is set as an average crystal grain size. The expected error is about 5%.

It is preferable that the thickness of the negative collector is 20 μm or less, and the purity of aluminum foil is 99.99% or more. It is also preferable that the aluminum alloy contains magnesium, tin, manganese, silicon, etc. In contrast, it is preferable that the amounts of transition metals, such as iron, copper, nickel and chrome, are set to 100 ppm or less.

A carbon material, such as acetylene black, carbon black, coke, carbon fiber or graphite, can be used as a conductive material.

As the binding agent, polytetrafluoroethylene (PTFE), polyvinylidene fluoride (PVdF), fluorine system rubber, butadiene-styrene rubber, etc., can be used.

Concerning the composition ratio of the negative-electrode active material, conductive agent and binding agent, it is preferable to set the negative-electrode active material to 80 to 95 weight %, set the conductive agent to 3 to 18 weight %, and set the binding agent to 2 to 7 weight %.

The negative electrode is produced by, for example, suspending the negative-electrode active material, conductive agent and binding agent in an appropriate solvent, coating an aluminum foil or aluminum alloy foil collector with the suspended solids, drying them and pressing them. The thickness of an active-material layer on one side of the negative collector is preferably 5 to 100 μm, and more preferably, 5 to 50 μm. If the thickness of the active-material layer falls within the range of 5 to 50 μm, the layer exhibits high thermal conductivity during charging/discharging of a large current, and suppresses rapid heat generation.

It is preferable to use, as the negative-electrode active material of the first nonaqueous electrolyte battery 6 (battery module A), a material that occludes and discharges lithium ions with an average grain size of 1 μm or more. As such a material, a lithium metal, lithium alloy or metal compound can be used. It is desirable to convert the negative-electrode active material of the average grain size of 1 μm or more into powder with a diameter of 1 μm or less as an active material precursor. The negative-electrode active material is acquired by crushing up the powder acquired after sintering into 1 μm or less, using a crusher, such as a ball mill or jet mill.

The grain size of the negative-electrode active material is measured by a laser-diffraction-type grain-size-distribution measuring apparatus (SALD-300 made by Shimazu Corporation). Firstly, a sample of about 0.1 g, an interfacial active material and distilled water of 1-2 mL are fed into a beaker and sufficiently agitated. After that, the resultant solution is injected into an agitation vessel, where it is subjected to light-intensity-distribution measurement performed 64 times at intervals of 2 seconds, thereby acquiring grain-size distribution data. Thus, measurement results, such as a grain-size distribution and average grain size, are obtained.

The lithium alloy is, for example, a lithium aluminum alloy, lithium tin alloy, lithium magnesium alloy, lithium silicon alloy or lithium lead alloy.

The carbon material that occludes and discharges lithium ions is, for example, natural graphite, artificial graphite, coke, vapor phase epoxy carbon fiber, meso-phase-pitch system carbon fiber, globular carbon, resin baked carbon. More preferably, the carbon material is natural graphite, artificial graphite, meso-phase-pitch system carbon fiber or globular carbon. Further, it is preferable that the face-to-face dimension $d_{002}$ of the faces (002) of the carbon material acquired by X-ray diffraction is 0.340 nm or less. It is more preferably that the carbon material is a graphite material acquired using, as a raw material, natural graphite with a face-to-face dimension $d_{002}$ of 0.337 nm or less. It is preferable to shape the graphite material like scales or grains. The metal compound may be a metal oxide, metal sulfide or metal nitride, etc. The metal oxide is, for example, tungsten oxide ($WO_3$), amorphous tin oxide, tin silicon oxide ($SnSiO_3$) or silicon oxide (SiO), etc. The metal sulfide is, for example, a lithium sulfide ($TiS_2$), molybdenum sulfide ($MoS_2$), or ferric sulfide (FeS, $FeS_2$, $Li_xFeS_2$). The metal nitride is, for example, a lithium cobalt nitride ($Li_xCo_yN$, $0<x<4$, $0<y<0.5$). It is desirable that the negative collector be formed of copper foil.

Preferably, the negative collector has a thickness of 20 μm or less. A carbon material can be used as a conductive agent providing the negative electrode. This carbon material may be acetylene black, carbon black, coke, carbon fiber or graphite, etc.

As the binding agent, polytetrafluoroethylene (PTFE), polyvinylidene fluoride (PVdF), butadiene-styrene rubber, etc., can be used.

Concerning the composition ratio of the negative-electrode active material, conductive agent and binding agent, it is preferable to set the negative-electrode active material to 80 to 100 weight %, set the conductive agent to 3 to 18 weight %, and set the binding agent to 2 to 7 weight %.

The negative electrode is produced by, for example, suspending the negative-electrode active material, conductive agent and binding agent in an appropriate solvent, coating an aluminum foil or aluminum alloy foil collector with the suspended solids, drying them and pressing them.

The thickness of an active-material layer on one side of the negative collector is preferably 30 to 250 μm, and more preferably, 50 to 200 μm. If the thickness of the active-material layer falls within the range of 50 to 200 μm, high power can be acquired during low-load discharging.

2) Positive Electrode

A positive electrode comprises a positive collector, and a positive-electrode layer provided on one or both sides of the collector and containing a positive-electrode active material, conductive agent and binding agent.

The positive collector may be formed of aluminum foil or aluminum alloy foil, and preferably, has an average crystal grain size of 50 μm or less, like the negative collector. More preferably, the average crystal grain size of the positive collector is 10 μm or less. When the average crystal grain size of the positive collector is 50 μm or less, the strength of the aluminum foil or aluminum alloy foil can be significantly enhanced, which enables the positive electrode to be pressed by high pressure, thereby enhancing the capacity density of the positive electrode. The smaller the average crystal grain size, the smaller the number of occurrences of pinholes and cracks, and the stronger the chemical and physical strengths of the positive collector. To make the collector to a degree of hardness appropriate for its fine crystalline structure, it is desirable to set the lower limit of the average crystal grain size to 0.01 µm.

The thickness of the positive collector is preferably 20 µm or less.

The active material of the positive electrode is, for example, an oxide, sulfide or polymer, etc. The oxide is, for example, a manganese dioxide such as $MnO_2$, ferric oxide, a copper oxide, a nickel oxide, a lithium manganese complex oxide such as $Li_xMn_2O_4$ or $Li_xMnO_2$, a lithium nickel complex oxide such as $Li_xNiO_2$, a lithium cobalt complex oxide such as $Li_xCoO_2$, a lithium nickel cobalt complex oxide such as $LiNi_{1-y}Co_yO_2$, a lithium manganese cobalt complex oxide such as $LiMn_yCo_{1-y}O_2$, a spinel-type lithium manganese nickel complex oxide such as $LiMn_{2-y}Ni_yO_4$, a lithium phosphor oxide of an olivine structure such as $Li_xFePO_4$, $Li_xFe_{1-y}PO_4$, $Li_xFeMn_yPO_4$, $Li_xCoPO_4$, a ferric sulfide such as $Fe_2(SO_4)_3$, or vanadium oxide such as $V_2O_5$. If there is no particular description, x and y preferably fall within a range of 0 to 1.

For instance, the polymer may be a conductive polymer material such as polyaniline or polypyrol, or a disulfide-based polymer material. Sulfur (S) or a carbon fluoride, etc., can also be used.

Preferably, the positive-electrode active material is, for example, a lithium manganese complex oxide, lithium nickel complex oxide, lithium cobalt complex oxide, lithium nickel cobalt complex oxide, spinel-type lithium manganese nickel complex oxide, lithium manganese cobalt complex oxide, or lithium iron phosphate. This is because a high positive-electrode voltage can be acquired from these materials. In particular, the lithium manganese complex oxide, lithium nickel complex oxide, lithium cobalt complex oxide, lithium nickel cobalt complex oxide and lithium manganese cobalt complex oxide can suppress reaction of the positive-electrode and negative-electrode active materials and nonaqueous electrolyte at high temperature, thereby significantly increasing the life of the battery.

Further, it is also preferable to use a lithium nickel cobalt manganese complex oxide expressed by $Li_aNi_bCo_cMn_dO2$ (where the mole ratio between a, b, c and d is $0 \leq a \leq 1.1$, b+c+D=1). The use of the lithium nickel cobalt manganese complex oxide enables a high battery voltage to be acquired. The more preferable ranges concerning the mole ratio between a, b, c and d are $0 \leq a \leq 1.1$, $0.1 \leq b \leq 0.5$, $0 \leq c \leq 0.9$ and $0.1 \leq d \leq 0.5$.

The conductive agent is, for example, acetylene black, carbon black or graphite.

The binding agent is, for example, polytetrafluoroethylene (PTFE), polyvinylidene fluoride (PVdF), butadiene-styrene rubber, etc.

Concerning the composition ratio of the negative-electrode active material, conductive agent and binding agent, it is preferable to set the negative-electrode active material to 80 to 95 weight %, set the conductive agent to 3 to 18 weight %, and set the binding agent to 2 to 7 weight %.

The positive electrode is produced by, for example, suspending the negative-electrode active material, conductive agent and binding agent in an appropriate solvent, coating an aluminum foil or aluminum alloy foil collector with the suspended solids, drying them and pressing them. The thickness of an active-material layer on one side of the positive collector is preferably 5 to 250 µm, and more preferably, 5 to 200 µm. If the thickness of the active-material layer falls within the range of 5 to 200 µm, the layer exhibits high thermal conductivity during charging/discharging of a large current, and suppresses rapid heat generation.

3) Separator

As the separator, synthetic resin nonwoven fabric, a polyethylene porous film or a polypropylene porous film, etc., can be used.

4) Nonaqueous Electrolyte

The nonaqueous electrolyte is, for example, a liquid nonaqueous electrolyte prepared by dissolving an electrolyte by an organic solvent, a gelled nonaqueous electrolyte acquired by combining the liquid nonaqueous electrolyte and a polymer material, or a solid nonaqueous electrolyte acquired by combining lithium salt and a polymer material. Further, a room-temperature molten salt (ionic melt) containing lithium ions may be used as the nonaqueous electrolyte.

The liquid nonaqueous electrolyte is, for example, $LiClO_4$, $LiPF_6$, $LiBF_4$, $LiAsF_6$, $LiCF_3SO_3$, $LiN(CF_3SO_2)_2$, $Lin(C_2F_5SO_2)_2$, $Li(CF_3SO_2)_3C$ or $LiB[(OCO)_2]_2$, etc. One or more types of electrolytes can be used.

The organic solvent is, for example, a cyclic carbonate such as propylene carbonate (PC) or ethylene carbonate (EC), an open-chain carbonate such as diethyl carbonate (DEC), dimethyl carbonate (DMC) or methylethyl carbonate, an open-chain ether such as dimethoxyethane (DME) or diethoxyethane (DEE), a cyclic ether such as tetrahydrofuran (THF) or dioxolane (DOX), or a single or mixed solvent such as γ-butyrolactone (GBL), acetonitrile (AN) or sulfolane (SL). If a nonaqueous electrolyte containing GBL is used, the amount of gas occurring during charging can be reduced. It is more preferable if a nonaqueous electrolyte containing, as well as GBL, at least one selected from the group consisting of PC and EC.

As the polymer material, polyvinylidene fluoride (PVdF), polyacrylonitrile (PAN), polyethylene oxide (PEO), etc., can be used.

Further, the room-temperature molten salt (ionic melt) is formed of lithium ions, organic cation and organic anion. Preferably, the molten salt is kept liquid at 100° C. or less, and more preferably, at room temperature or less.

5) Container

As the container, a metal container can also be used as well as the laminate-film container 17 shown in FIG. 3. The container may be shaped flat, rectangular, cylindrical, laminated, or like a coin or button or sheet. The size of the container may be, for example, that of a large battery installed in an electric motor car, etc.

As the laminate film, a multi-layer film including a metal layer and a resin layer coating the metal layer may be used, for example. To reduce the weight, it is preferable to form the metal layer of aluminum foil or aluminum alloy foil. The resin layer is used to reinforce the metal layer and may be formed of a polymer, such as polypropylene (PP), polyethylene (PE), nylon or polyethylene terephthalate (PET).

The laminate-film container can be acquired by, for example, attaching laminate films to each other by thermal fusion bonding.

It is preferable to set the thickness of the laminate film to 0.5 mm or less. It is also preferable to set, to 0.01 mm, the lower limit of the thickness of the laminate film.

It is preferable to form the metal container of aluminum or an aluminum alloy. It is also preferable to set the average crystal grain size to 50 µm or less. If the average crystal grain size is set to 50 µm or less, the strength of the aluminum or aluminum alloy container is increased. Therefore, in this case, even if the metal container is formed thin, it can have sufficient mechanical strength. If the metal container is formed thin, the heat-releasing property of the container is enhanced, thereby suppressing an increase in the temperature of the battery. Further, the energy density is also enhanced, which enables the battery to be made lighter and smaller. It is more preferable to set the average crystal grain size to 10 μm or less. The smaller the average crystal grain size, the stronger the chemical and physical strengths. However, from the fact that a fine crystal structure is desirable to acquire excellent conductivity, it is desirable to set the lower limit of the average crystal grain size to 0.01 μm.

These features are suitable to batteries for which high-temperature resistance and high density, etc., are required. For instance, they are suitable to secondary batteries for on-vehicle power supply systems.

It is preferable to set the thickness of the metal container to 0.5 mm or less, and also to set the lower limit of the thickness to 0.05 mm.

The purity of the above-mentioned aluminum foil is desirably 99.99% or more. It is preferable to use, as the above-described aluminum alloy, an aluminum alloy containing elements such as magnesium, zinc and silicon. It is preferable that the amounts of transition metals, such as iron, copper, nickel and chrome, are set to 100 ppm or less.

The metal container can be sealed using a laser. Therefore, the volume of the sealing portion can be reduced compared to a laminate-film container, and hence the energy density can be enhanced.

Second Embodiment

The storage battery system of the first embodiment is suitable for rapid charging and discharging, as well as for charging using regenerative power. Examples of this use are a power supply for digital cameras, a power supply for light vehicles such as assist bicycles, a backup power supply (uninterruptible power supply devices) for personal computers or for use in factories, and a cleaner.

A storage battery system according to a second embodiment can be made to the same structure as that of the system of the first embodiment, except for regenerative power is not used for charging. It is preferable to set the charging rate to a range of 2 C or more and 120 C or less. Incidentally, "1 C" is a current required for each unit cell to be completely discharged within an hour. For convenience, the nominal capacitance of each unit cell can be replaced with 1 C.

Figure 5:
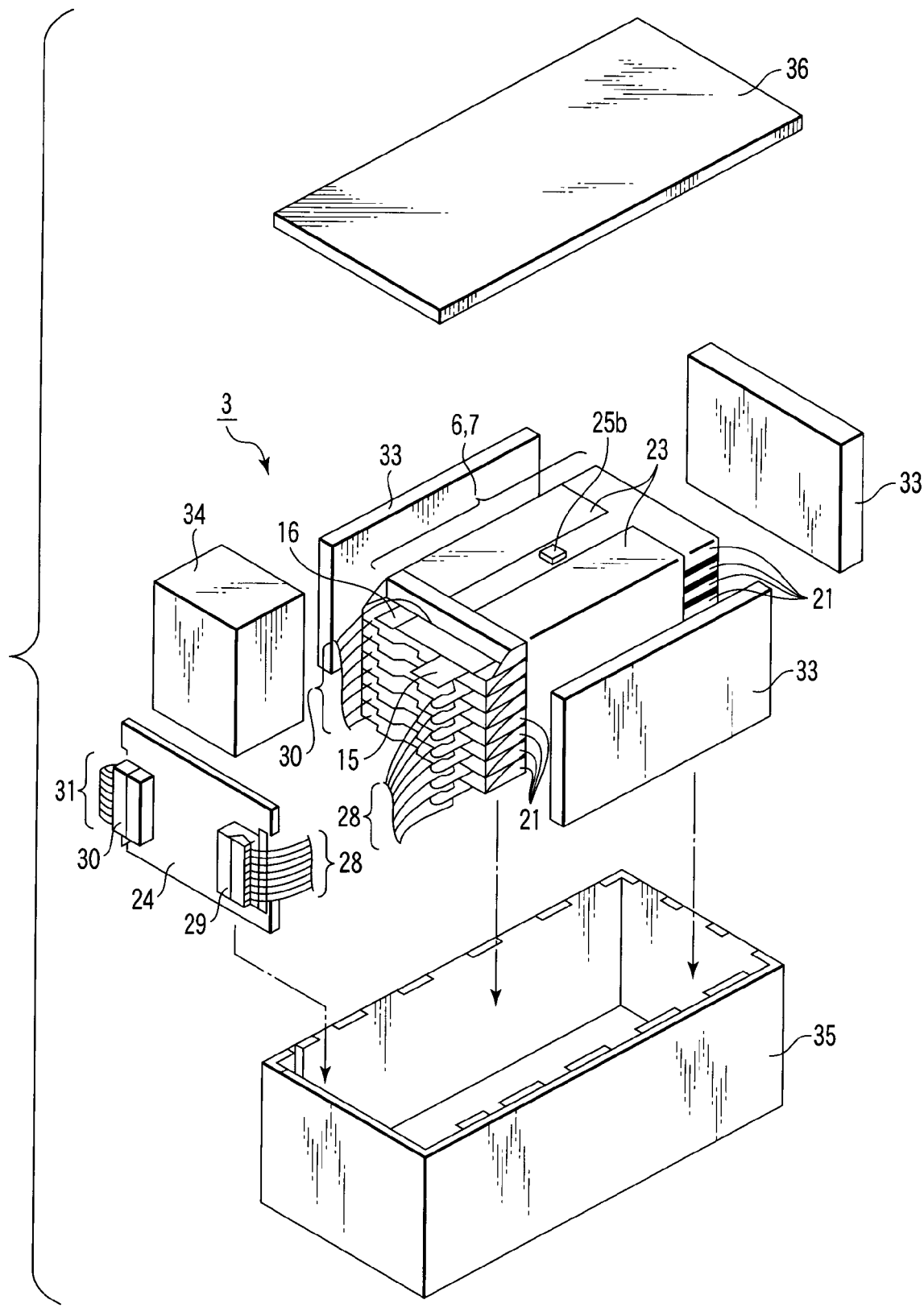
FIG. 5 is an exploded perspective view illustrating a battery pack for use in storage battery systems according to first and second embodiments.
Figure 6:
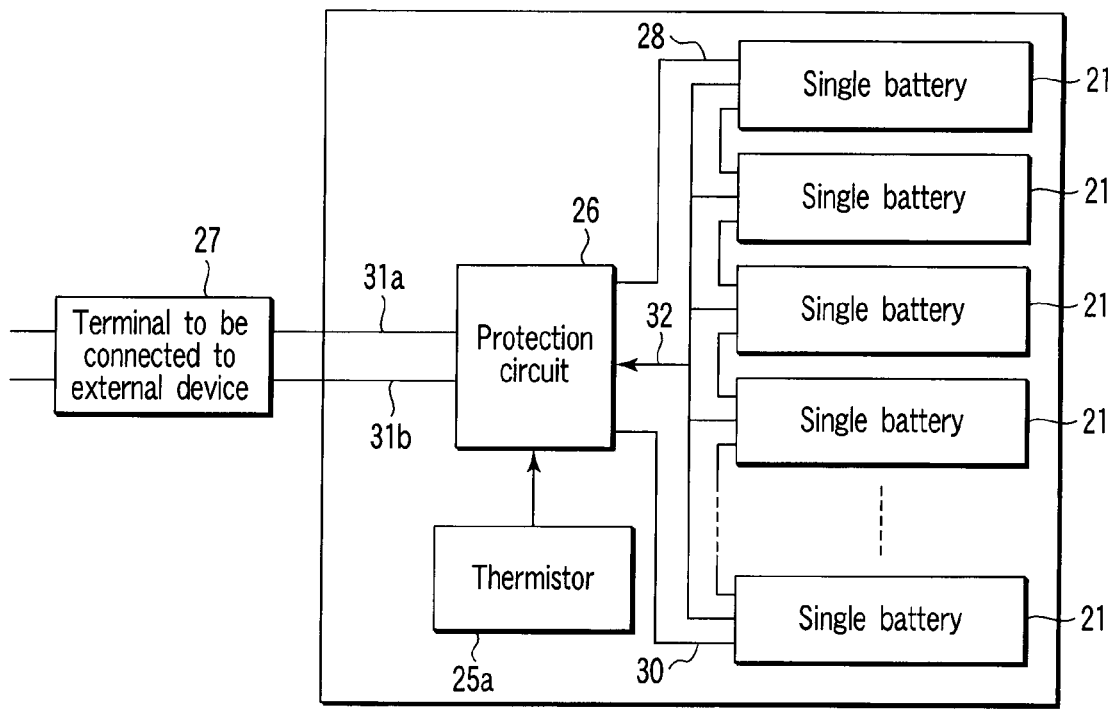
FIG. 6 is a block diagram illustrating the electrical circuits of the battery pack of FIG. 5.

In the storage battery systems of the first and second embodiments, a battery pack containing, in a single case, the battery modules 6 and 7 and battery control unit (BMU) 4 can be used. In the storage battery system of the second embodiment, supply of regenerative power is not necessary, and hence the battery pack can be used as the storage battery system. Referring to FIGS. 5 and 6, a structure example of the battery pack will be described. FIG. 5 is an exploded perspective view of the battery pack used in the storage battery system of the second embodiment. FIG. 6 is a block diagram illustrating the circuit diagram of the battery pack of FIG. 5.

Each single battery 21 included in the battery pack of FIG. 5 is formed of the flat nonaqueous electrolyte battery shown in FIG. 3. A plurality of single batteries 21 are stacked on each other in the thickness direction of the battery, with positive and negative terminals 15 and 16 protruded in the same direction. As shown in FIG. 6, the single batteries 21 are connected in series, thereby providing the battery modules 6 and 7. The battery modules 6 and 7 are formed integral by an adhesive tape 23 as shown in FIG. 5.

The rated capacity of each single battery 21 is, desirably, 2 Ah or more and 100 Ah or less, and more preferably, to 3 Ah or more and 40 Ah or less. The rated capacity means the capacity acquired when discharge is executed at a rate of 0.2 C.

It is preferable to set the number of single batteries 21 to 5 or more and 500 or less, and more preferably, to 5 or more and 200 or less. Further, in on-vehicle power supply systems, to acquire high voltage, it is desirable to connect the single batteries 21 in series.

A printed circuit board 24 is provided at the side of the battery from which the positive and negative terminals 15 and 16 protrude. The printed circuit board 24 mounts thereon a thermistor meter section 25a, a protection circuit 26 and a terminal 27 to be connected to an external device, shown in FIG. 6.

Thermistor measuring sections 25b may be provided for arbitrary ones of the single batteries 21. Alternatively, thermistor measuring sections 25b may be provided for all single batteries 21. When a certain number of thermistor measuring sections 25b are provided for arbitrary single batteries 21, at least one thermistor measuring section 25b must be provided for the single battery 21 located at the vertical center of the battery modules 6 and 7 stacked vertically. Further, the highest temperature detected is set as the temperature of the battery modules 6 and 7, regardless of whether thermistor measuring sections 25b are provided for arbitrary unit cells 21 or all single batteries 21. Furthermore, it is desirable to locate the thermistor measuring section 25b on the center of the flat surface of the single battery 21. The measurement result of the thermistor is sent as a detected signal to the protection circuit 26. The positive-side lines 28 of the battery modules 6 and 7 are electrically connected to the positive-side connector 29 of the protection circuit 26 of the printed circuit board 24. The negative-side lines 30 of the battery modules 6 and 7 are electrically connected to the negative-side connector 31 of the protection circuit 26 of the printed circuit board 24.

The protection circuit 26 comprises a charge/discharge control circuit 40, charge interruption circuit 41, discharge interruption circuit 42, voltmeters 63a and 63b and ammeters 62a and 62b (see FIG. 4). A line 32 for detecting the voltage and current of each single battery 21 is connected thereto, and a signal acquired through the line 32 is sent to the protection circuit 26. The terminal 27 is connected to a charger and external load.

The protection circuit 26 serves not only as a battery control unit, but also as a unit for disconnecting, from each other, a plus-side line 31a and minus-side line 31b between the circuit 26 and terminal 27 under a preset condition, to thereby secure safety. The preset condition is, for example, "when the detected temperature reaches a preset value", or "when excessive charging, discharging or current of each single battery 21 is detected". This detection method is executed concerning each single battery 21 or the entire single batteries 21. When detection is executed on each single battery 21, its voltage may be detected, or its positive or negative potential may be detected. In the latter case, a lithium electrode as a reference electrode is interposed between each pair of adjacent ones of the single batteries 21.

As shown in FIG. 5, three sides of the battery modules 6 and 7, other than the side from which the positive and negative terminals 15 and 16 protrude, are coated with protection sheets 33 made of rubber or resin. A protection block 34 made of rubber or resin is interposed between the printed circuit board 24 and the side of the battery modules 6 and 7, from which the positive and negative terminals 15 and 16 protrude.

The battery modules 6 and 7 are contained in a container 35 along with the protection sheets 33, protection block 34 and printed circuit board 24. Specifically, the protection sheets 33 are located on the inner surfaces of the long sides of the container 35 and on the inner surface of one short side of the container 35, while the printed circuit board 24 is located on the inner surface of the other short side of the container 35. The battery modules 6 and 7 are located in the space defined by the protection sheets 33 and printed circuit board 24. A lid 36 is attached to close the upper opening of the container 35.

The battery modules 6 and 7 may be fixed using a thermally contractive tape, instead of the adhesive tapes 23. In this case, protective sheets are provided on opposite sides of the battery modules, and a thermally contractive tube is wound on the resultant structure. After that, the thermally contractive tube is thermally contracted to fix the battery modules.

Although the single batteries 21 shown in FIGS. 5 and 6 are connected in series, they may be connected parallel to each other to increase the battery capacity. It is a matter of course that the unit cells may be connected in series or parallel after they are assembled into a battery pack.

Figure 8:
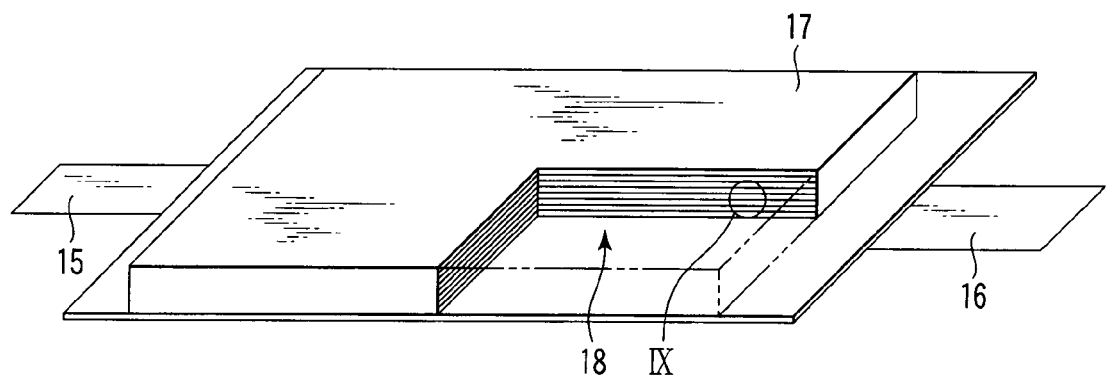
FIG. 8 is a perspective view partly broken, illustrating a flat nonaqueous electrolyte second battery, for use in the battery pack of FIG. 5, according to another embodiment.
Figure 9:
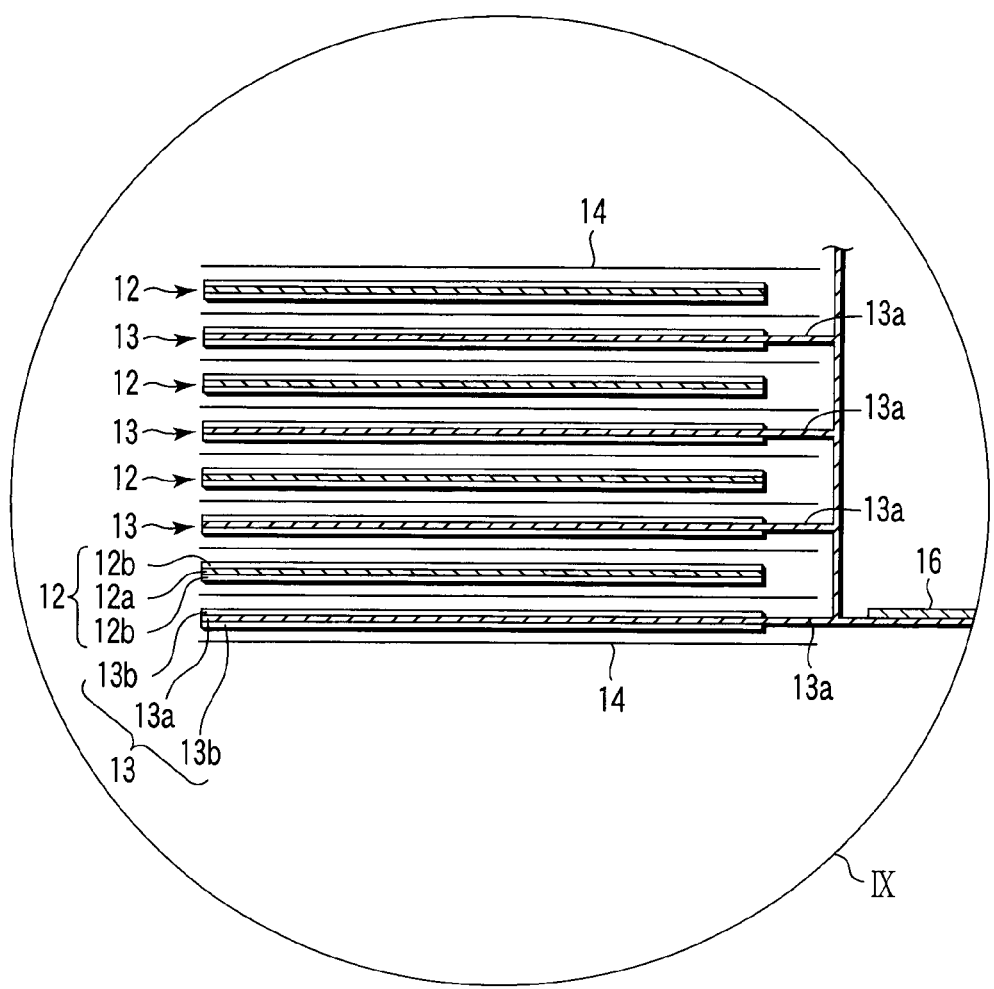
FIG. 9 is an enlarged sectional view of the IX portion of FIG. 8.

The flat nonaqueous electrolyte secondary battery for use in a battery pack is not limited to that shown in FIG. 3, but may have the structure shown in FIGS. 8 and 9. FIG. 8 is a perspective view partly broken, illustrating a flat nonaqueous electrolyte second battery for use in the battery pack of FIG. 5, and FIG. 9 is an enlarged sectional view of the IX portion of FIG. 8.

As shown in FIG. 8, the laminate-film container 17 contains a laminated electrode group 18. The laminated electrode group 18 has a laminated structure in which positive electrodes 12 and negative electrodes 13 are alternately stacked on each other, with a corresponding separator 14 interposed between each pair of adjacent ones of the electrodes 12 and 13. Each of the positive electrodes 12 includes a positive collector 12a, and layers 12b containing a positive-electrode active material and provided on the opposite surfaces of the positive collector 12a. Each of the negative electrodes 13 includes a negative collector 13a, and layers 13b containing a negative-electrode active material and provided on the opposite surfaces of the negative collector 13a. Each of the negative collectors 13a of the negative electrodes 13 has one end extended outward of the positive electrodes 12. The negative collectors 13a extended outward of the positive electrodes 12 is electrically connected to a band-shaped negative terminal 16. The distal end of the band-shaped negative terminal 16 is extended to the outside of the container 17. Further, each of the positive collectors 12a of the positive electrodes 12 has one end (not shown) extended outward of the negative electrodes 13 at the opposite side of the extended end of each negative collector 13a. The positive collectors 12a extended outward of the negative electrodes 13 are electrically connected to a band-like positive terminal 15. The distal end of the band-like positive terminal 15 is positioned at the opposite side of the negative terminal 16, and extended outward of the container 17.

EXAMPLES

Examples of the invention will be described in detail with reference to the above-referred drawings. The invention is not limited to the following examples. It is sufficient if the invention does not depart from the scope.

Example 1

A description will be given of a method for producing the negative electrode of a second nonaqueous electrolyte battery 7 included in the battery module B. Lithium titanate ($Li_4Ti_5O_{12}$) with an average grain size of 0.3 μm, as an active material, carbon powder with an average grain size of 0.4 μm, as a conductive agent, and polyvinylidene fluoride (PVdF) as a binding agent were mixed with a weight ratio of 90:7:3 in n-methylpyrrolidone (NMP) solvent, thereby preparing slurry. The slurry was coated on aluminum alloy foil (purity: 99.4%) with a thickness of 12 μm and an average crystal grain size of 50 μm, and the resultant structure was dried and pressed to thereby prepare a negative electrode with an electrode density of 2.4 g/cm³. The negative collector was prepared by annealing, at 200° C., aluminum alloy foil (purity: 99.4%) with a thickness of 12 μm and an average crystal grain size of 90 μm, and then cooling the resultant structure to room temperature.

A method for producing the positive electrode of the battery 7 will be described. Lithium cobalt oxide ($LiCoO_2$) with an average grain size of 3 μm, as an active material, graphite powder as a conductive agent, and polyvinylidene fluoride (PVdF) as a binding agent were mixed with a weight ratio of 87:8:5 in n-methylpyrrolidone (NMP) solvent, thereby preparing slurry. The slurry was coated on aluminum foil (purity: 99.99%) with a thickness of 15 μm and an average crystal grain size of 12 μm, and the resultant structure was dried and pressed to thereby prepare a positive electrode with an electrode density of 3.5 g/cm³. The positive collector was prepared by annealing, at 140° C., aluminum foil (purity: 99.99%) with a thickness of 15 μm and an average crystal grain size of 90 μm, and then cooling the resultant structure to room temperature.

As the material of the container, a laminate film containing aluminum and having a thickness of 0.1 mm was used. The aluminum layer included in the laminate film containing aluminum had a thickness of about 0.03 mm, and had an average crystal grain size of about 100 μm. Polypropylene was used as a resin for reinforcing the aluminum layer. The container was prepared by sealing the laminate film utilizing thermal fusion bonding.

Subsequently, a band-like positive terminal was electrically connected to the positive electrode, and a band-like negative terminal was electrically connected to the negative electrode. A separator formed of a polyethylene porous film with a thickness of 12 μm was tightly attached to the positive electrode to cover it. The negative electrode was superposed upon the positive electrode covered with the separator. A plurality of electrodes thus prepared were wound spirally into an electrode group. The electrode group was pressed flat and inserted in the container.

1.5 mol/L of a lithium salt, $LiBF_4$, was dissolved in an organic solvent containing EC and GBL with a volume ratio of 1:2 (EC:GBL) to prepare a liquid nonaqueous electrolyte. The resultant nonaqueous electrolyte was injected into the container, whereby a nonaqueous electrolyte battery 7 with a thickness of 6.5 mm, a width of 70 mm and a height of 100 mm, which had the above-described structure shown in FIG. 2, was acquired. The weight of the battery was 90 g and its nominal capacity was 3000 mAh.

Five nonaqueous electrolyte batteries 7 similar to the above were prepared and connected in series on a plastic plate, thereby forming one module. 17 modules similar to this were prepared and connected in series, thereby producing a battery module B incorporated in a storage battery system (rated voltage: 200V; rated capacity: 3 Ah).

A method for producing the negative electrode of the first nonaqueous electrolyte battery 6 included in the battery module A will be described. Natural graphite powder with an average grain size of 10 μm, as an active material, and polyvinylidene fluoride (PVdF) as a binding agent were mixed with a weight ratio of 95:5 in n-methylpyrrolidone (NMP) solvent, thereby preparing slurry. The slurry was coated on copper foil (purity: 99.9%) with a thickness of 12 μm, and the resultant structure was dried and pressed to thereby prepare a negative electrode with an electrode density of 1.3 g/cm³ (the thickness of the negative-electrode active material: 150 μm).

A method for producing the positive electrode of the battery 6 will be described. Lithium cobalt oxide ($LiCoO_2$) with an average grain size of 3 μm, as an active material, graphite powder as a conductive agent, and polyvinylidene fluoride (PVdF) as a binding agent were mixed with a weight ratio of 87:8:5 in n-methylpyrrolidone (NMP) solvent, thereby preparing slurry. The slurry was coated on aluminum foil (purity: 99.99%) with a thickness of 15 μm and an average crystal grain size of 12 μm, and the resultant structure was dried and pressed to thereby prepare a positive electrode with an electrode density of 3.5 g/cm³. The positive collector was prepared by annealing, at 140° C., aluminum foil (purity: 99.99%) with a thickness of 15 μm and an average crystal grain size of 90 μm, and then cooling the resultant structure to room temperature.

As the material of the container, a laminate film containing aluminum and having a thickness of 0.1 mm was used. The aluminum layer included in the laminate film containing aluminum had a thickness of about 0.03 mm, and had an average crystal grain size of about 100 μm. Polypropylene was used as a resin for reinforcing the aluminum layer. The container was prepared by sealing the laminate film utilizing thermal fusion bonding.

Subsequently, a band-like positive terminal was electrically connected to the positive electrode, and a band-like negative terminal was electrically connected to the negative electrode. A separator formed of a polyethylene porous film with a thickness of 12 μm was tightly attached to the positive electrode to cover it. The negative electrode was superposed upon the positive electrode covered with the separator. A plurality of electrodes thus prepared were wound spirally into an electrode group. The electrode group was pressed flat and inserted in the container.

1.5 mol/L of a lithium salt, $LiBF_4$, was dissolved in an organic solvent containing EC and GBL with a volume ratio of 1:2 (EC:GBL) to prepare a liquid nonaqueous electrolyte. The resultant nonaqueous electrolyte was injected into the container, whereby a nonaqueous electrolyte battery A with a thickness of 13 mm, a width of 70 mm and a height of 150 mm, which had the above-described structure shown in FIG. 2, was acquired. The weight of the battery was 400 g and its nominal capacity was 12 Ah.

Three nonaqueous electrolyte batteries 6 similar to the above were prepared and connected in series on a plastic plate, thereby forming one module. Twenty modules similar to this were prepared and connected in series, thereby producing a battery module A incorporated in a storage battery system (rated voltage: 211V; rated capacity: 15 Ah).

Using the prepared battery modules A and B, battery control unit (BMU) 4 and booster mechanism 2, the above-described storage battery system and on-vehicle power supply system shown in FIGS. 1 and 2 were prepared.

Concerning the battery module B, a storage test was executed, in which a constant voltage charge of 220V and 5 minutes was applied from the battery module A to the battery module B once (one time) per 10 days, with the SOC levels of the battery modules A and B set at 90% and 50%, respectively, and the motor/dynamo stopped for 180 days at a temperature of 45° C. In this test, changes in the resistance of the battery module B were measured.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 2

A storage test was executed, in which power was supplied from the battery module A to the battery module B two times per one day, with the SOC levels of the battery modules A and B set at 90% and 10%, respectively, and the motor/dynamo stopped for 180 days at the temperature of 45° C. In this test, changes in the resistance of the battery module B were measured. In example 2, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 3

A storage test was executed, in which power was supplied from the battery module A to the battery module B once per 30 days, with the SOC levels of the battery modules A and B set at 90% and 90%, respectively, and the motor/dynamo stopped for 180 days at the temperature of 45° C. In this test, changes in the resistance of the battery module B were measured. In example 3, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 4

A storage test was executed, in which power was supplied from the battery module A to the battery module B once per 30 days, with the SOC levels of the battery modules A and B set at 90% and 80%, respectively, and the motor/dynamo stopped for 180 days at the temperature of 45° C. In this test, changes in the resistance of the battery module B were measured. In example 4, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 5

A storage test was executed, in which power was supplied from the battery module A to the battery module B once per 10 days, with the SOC levels of the battery modules A and B set at 90% and 60%, respectively, and the motor/dynamo stopped for 180 days at the temperature of 45° C. In this test, changes in the resistance of the battery module B were measured. In example 5, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 6

A storage test was executed, in which power was supplied from the battery module A to the battery module B two times per 10 days, with the SOC levels of the battery modules A and B set at 90% and 40%, respectively, and the motor/dynamo stopped for 180 days at the temperature of 45° C. In this test, changes in the resistance of the battery module B were measured. In example 6, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 7

A storage test was executed, in which power was supplied from the battery module A to the battery module B once per one day, with the SOC levels of the battery modules A and B set at 90% and 20%, respectively, and the motor/dynamo stopped for 180 days at the temperature of 45° C. In this test, changes in the resistance of the battery module B were measured. In example 7, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Example 8

A storage test was executed, in which power was supplied from the battery module A to the battery module B once per five days, with the SOC levels of the battery modules A and B set at 90% and 50%, respectively, and the motor/dynamo stopped for 180 days at the temperature of 45° C. In this test, changes in the resistance of the battery module B were measured. In example 8, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Comparative Example 1

A storage test was executed, in which no power was supplied from the battery module A to the battery module B, with the SOC levels of the battery modules A and B set at 90% and 10%, respectively, and the motor/dynamo stopped for 180 days at the temperature of 45° C. Also in this test, changes in the resistance of the battery module B were measured. In comparative example 1, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Comparative Example 2

A storage test was executed, in which power was continuously supplied from the battery module A to the battery module B, with the motor/dynamo stopped for 180 days at the temperature of 45° C. In this test, the SOC levels of the battery modules A and B were initially set at 90% and 10%, respectively, and the SOC of the battery module B was kept at 90 to 95% by the continuous supply of power. Also in this test, changes in the resistance of the battery module B were measured. In comparative example 2, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Comparative Example 3

A storage test was executed, in which power was continuously supplied from the battery module A to the battery module B, with the motor/dynamo stopped for 180 days at a temperature of 60° C. In this test, the SOC levels of the battery modules A and B were initially set at 90% and 50%, respectively, and the SOC of the battery module B was kept at 50% by the continuous supply of power. Also in this test, changes in the resistance of the battery module B were measured. In comparative example 3, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Comparative Example 4

In this comparative example, the battery module B was formed of a nonaqueous electrolyte and had the same structure as the battery module A. A storage test was executed, in which power was continuously supplied from the battery module A to the battery module B, with the motor/dynamo stopped for 180 days at the temperature of 45° C. In this test, the SOC levels of the battery modules A and B were initially set at 90% and 90%, respectively, and the SOC of the battery module B was kept at 90 to 95% by the continuous supply of power. Also in this test, changes in the resistance of the battery module B were measured. In comparative example 4, the same storage battery system and on-vehicle power supply system as in example 1 were used.

Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured.

Comparative Example 5

A storage test was executed, in which no power was supplied from the battery module A to the battery module B, with the SOC levels of the battery modules A and B set at 90% and 90%, respectively, and the motor/dynamo stopped for 180 days at the temperature of 45° C. Also in this test, changes in the resistance of the battery module B were measured. Further, the time, during which the motor can be powered by the battery module B in an acceleration mode using 200V and 60 A (12 kW), and the time, during which the motor can be powered by the battery module A in a constant-speed driving mode using 220V and 3 A (0.66 kW), were measured. In comparative example 5, the same storage battery system and on-vehicle power supply system as in example 1 were used.

TABLE 1

|  | Temperature (° C.) | SOC (%) of battery module A | SOC (%) of battery module B | Frequency of supply of power (times per 30 days) | SOC (%) of battery module B after 180 days | Change (%) in resistance of battery module B after 180 days |
|---|---|---|---|---|---|---|
| Example 1 | 45 | 90 | 50 | 3 | 50 | 10 |
| Example 2 | 45 | 90 | 10 | 60 | 40 | 5 |
| Example 3 | 45 | 90 | 90 | 1 | 75 | 20 |
| Example 4 | 45 | 90 | 80 | 1 | 60 | 15 |
| Example 5 | 45 | 90 | 60 | 3 | 55 | 10 |
| Example 6 | 45 | 90 | 40 | 6 | 40 | 5 |
| Example 7 | 45 | 90 | 20 | 30 | 40 | 5 |
| Example 8 | 60 | 90 | 50 | 6 | 45 | 15 |
| Comparative Example 1 | 45 | 90 | 10 | 0 | 0 | 100 |
| Comparative Example 2 | 45 | 90 | 90 | Continued | 95 | 150 |
| Comparative Example 3 | 60 | 90 | 50 | Continued | 80 | 200 |
| Comparative Example 4 | 45 | 90 | 90 | Continued | 95 | 250 |
| Comparative Example 5 | 45 | 90 | 10 | 0 | 0 | 100 |

TABLE 2

|  | Driving time in 12-kW output mode | Driving time in 0.66-kW output mode |
|---|---|---|
| Example 1 | 60 sec. | 4 H |
| Example 2 | 55 sec. | 3.5 H |
| Example 3 | 70 sec. | 4.2 H |
| Example 4 | 65 sec. | 4.1 H |
| Example 5 | 65 sec. | 4 H |
| Example 6 | 42 sec. | 3.5 H |
| Example 7 | 42 sec. | 3.2 H |
| Example 8 | 40 sec. | 3.4 H |
| Comparative Example 1 | 0 sec. | 4 H |
| Comparative Example 2 | 10 sec. | 3.5 H |
| Comparative Example 3 | 8 sec. | 3 H |
| Comparative Example 4 | 5 sec. | 3 H |
| Comparative Example 5 | 0 sec. | 0 sec. |

From Tables 1 and 2, it was confirmed that the storage battery systems of examples 1 to 8 are excellent in charge storage property, resistance change, and high output/input properties and exhibit long lives at high temperature after 180 days use, compared to comparative examples 1 to 5. Further, the on-vehicle power supply systems of examples 1 to 8 are excellent in driving performance, i.e., can exhibit, for a long time, high-speed motor driving (acceleration) and low-speed motor driving (constant-speed driving), compared to comparative examples 1 to 5.

FIGS. 10 to 15 show various hybrid-type vehicles utilizing a driving power supply that is formed of an internal combustion engine and a motor powered by a battery. For driving a vehicle, a power supply is needed, which provides a wide rotational-speed range and torque range according to driving conditions. In general, in the case of internal combustion engines, the torque and rotational-speed ranges that exhibit ideal energy efficiency are limited, and therefore energy efficiency is reduced in the other driving conditions. Hybrid vehicles are advantageous in that the overall energy efficiency of the vehicle can be enhanced by operating the internal combustion engine under optimal conditions, by driving the wheels using the highly efficient motor, or by powering the vehicle using both the internal combustion engine and motor. They are also advantageous in that the physical energy of the wheels is collected as regenerative power during deceleration to thereby significantly increase the traveling distance per unit fuel, compared to vehicles that utilize only internal combustion engines.

Hybrid vehicles can be mainly classified into three types in accordance with the ways of combining the internal combustion engine and motor.

Figure 10:
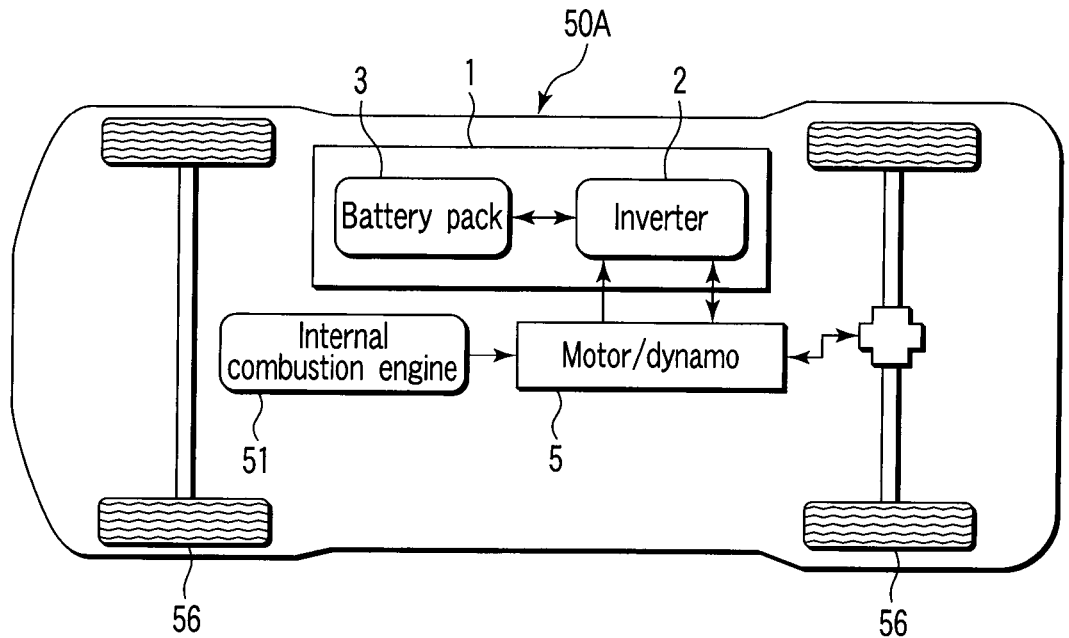
FIG. 10 is a schematic view showing the bottom of a hybrid vehicle, along with a storage battery system of the invention incorporated in the vehicle.
Figure 11:
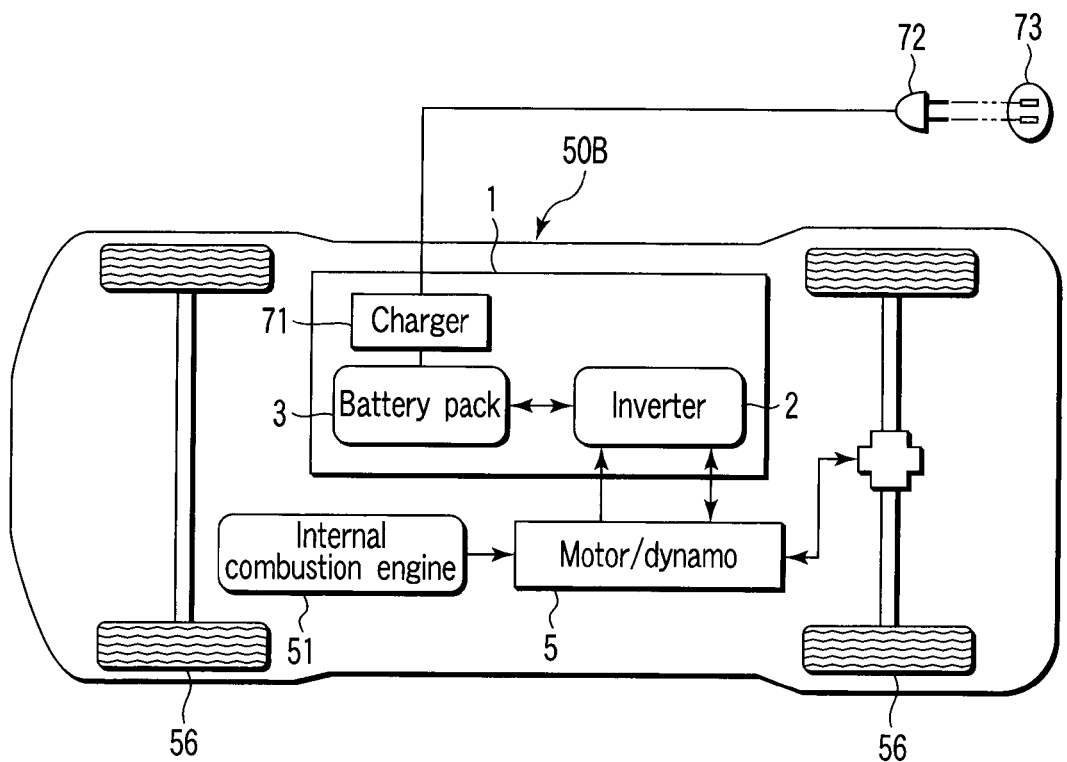
FIG. 11 is a schematic view showing the bottom of a plug-in-type hybrid vehicle, along with the storage battery system of the invention incorporated in the vehicle.

FIG. 10 shows a series hybrid vehicle 50A. FIG. 11 shows a plug-in series hybrid vehicle 50B. In these vehicles, the motive energy of an internal combustion engine 51 is once converted into electrical power by a motor/dynamo 5, and the electrical power is accumulated in a battery pack 3 via an inverter 2. The battery module B of the battery pack 3 is supplied to the electrical power of the motor/dynamo 5 via the inverter 2. The motor/dynamo 5, in turn, drive wheels 56. This type is a system acquired by combining an electrical vehicle and dynamo. The internal combustion engine 51 can operate under highly efficient conditions and can regenerate electrical power. In contrast, the wheels 56 are driven only by the motor/dynamo 5, therefore a high-output motor is required. A battery pack of a relatively large capacity is also required. It is preferable to set the rated capacity of the battery pack 3 to a range of 5 to 50 Ah. A more preferable range is 10 to 20 Ah. The rated capacity means the capacity determined when discharge is executed at a rate of 0.2 C. The plug-in hybrid vehicle 50B comprises a plug 72 connectable to an external power-supply socket 73, and a built-in charger 71 interposed between the plug 72 and the battery module B of the battery pack 3. The plug 72 is connected to the power-supply socket 73 to supply external power to the battery module B of the battery pack 3, and then to the battery module A from the battery module B. In the plug-in hybrid vehicle SOB, a plug 72 is inserted into a power supply socket 73, and the battery pack 3 is charged by a built-in charger 71.

Figure 12:
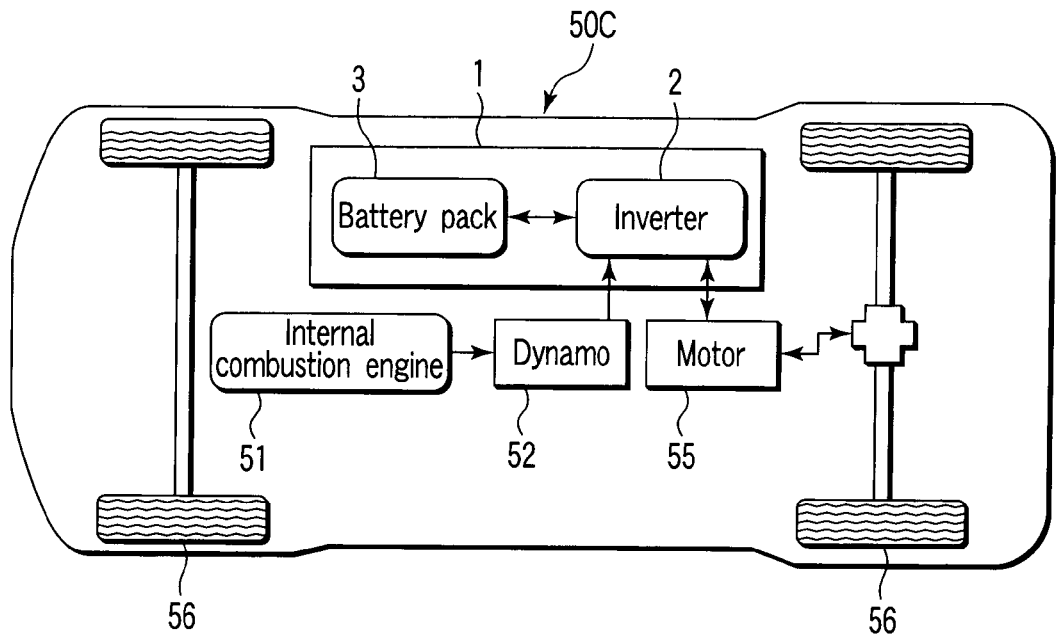
FIG. 12 is a schematic view showing the bottom of a hybrid vehicle, along with another storage battery system of the invention incorporated in the vehicle.
Figure 13:
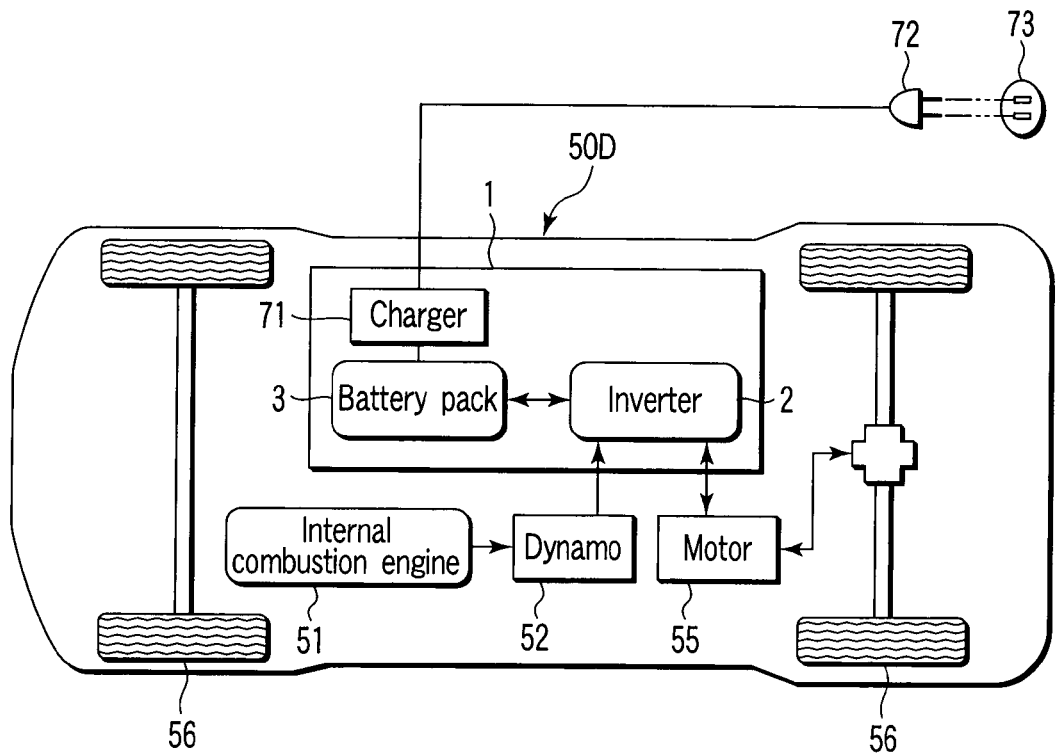
FIG. 13 is a schematic view showing the bottom of a plug-in-type hybrid vehicle, along with said another storage battery system of the invention incorporated in the vehicle.

FIG. 12 shows parallel hybrid vehicle 50C. FIG. 13 shows a plug-in parallel hybrid vehicle 50D. Reference number 58 denotes an electric motor that also serves as a dynamo. The internal combustion engine 51 mainly drives wheels 56, and when necessary, part of the motive energy is converted into electrical power using the dynamo 58, and the resultant electrical power is charged in battery module B of the battery pack 54. During starting or acceleration during which high torque is required, the motor 58 assists driving. This type vehicle is a system that is produced based on a standard vehicle to reduce variations in the load of the internal combustion engine 51 and to realize high efficiency and power regeneration. The wheels 56 is mainly driven by the internal combustion engine 51, and the output of the motor 58 is determined in accordance with the driving force to be supplemented. Accordingly, the system can employ a relatively small motor 58 and battery pack 54. The rated capacity of the battery pack can be set to fall within a range of 1 to 20 Ah, and more preferably, a range of 5 to 10 Ah. The plug-in hybrid vehicle 50D comprises also a plug 72 connectable to an external power-supply socket 73, and a built-in charger 71 interposed between the plug 72 and the battery module B of the battery pack 3. In the plug-in hybrid vehicle 50D, a plug 72 is inserted into a power supply socket 73, and the battery pack 3 is charged by a built-in charger 71.

Figure 14:
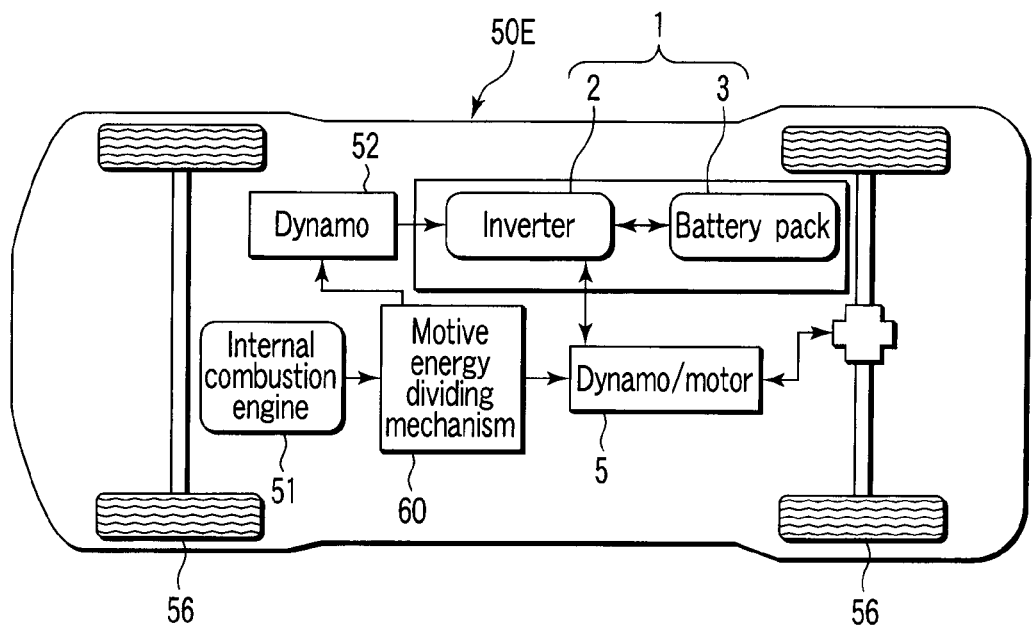
FIG. 14 is a schematic view showing the bottom of a hybrid vehicle, along with yet another storage battery system of the invention incorporated in the vehicle.
Figure 15:
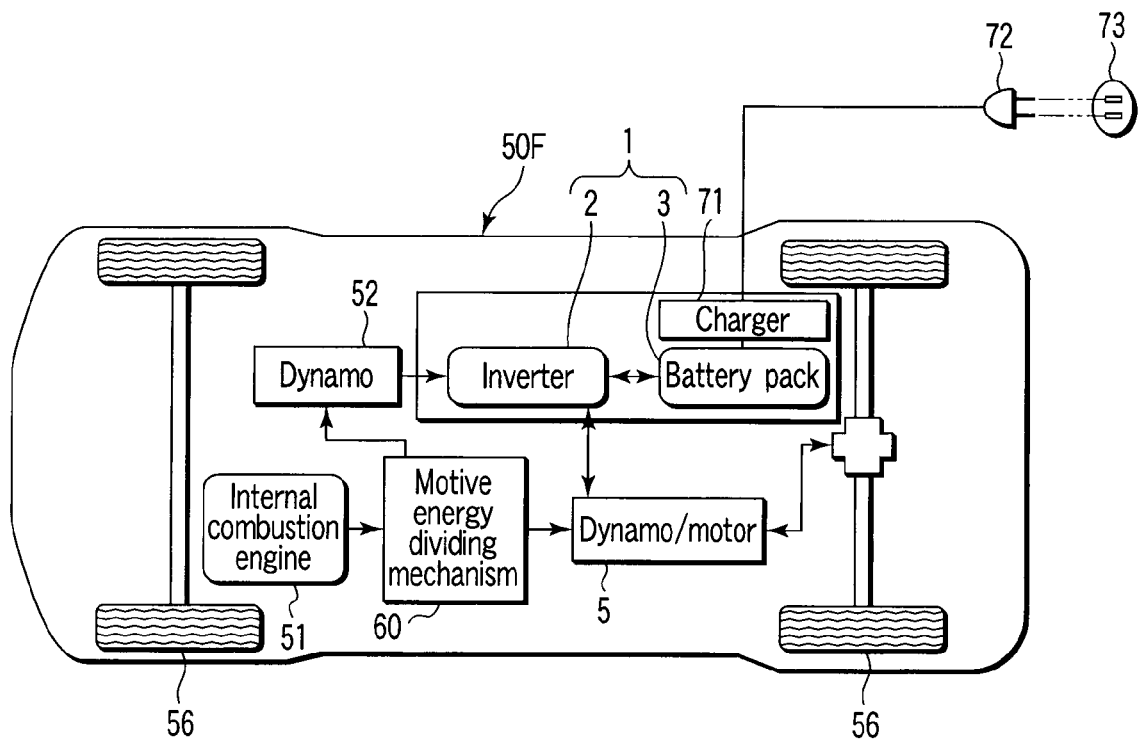
FIG. 15 is a schematic view showing the bottom of a plug-in-type hybrid vehicle, along with said yet another storage battery system of the invention incorporated in the vehicle.

FIG. 14 shows a series/parallel hybrid vehicle 50E. FIG. 15 shows a plug in a series/parallel hybrid vehicle 50F. A motive-energy dividing mechanism 60 divides the output of the internal combustion engine 51 into energy for the generation of electricity and for driving the wheels. These vehicles can perform more accurate load control of the engine and exhibit higher energy efficiency than the parallel type. Preferably, the rated capacity of the battery pack 3 is set to fall within a range of 1 to 20 Ah. A more preferable range is 5 to 10 Ah. The plug-in hybrid vehicle 50F comprises also a plug 72 connectable to an external power-supply socket 73, and a built-in charger 71 interposed between the plug 72 and the battery module B of the battery pack 3. In the plug-in hybrid vehicle 50F, a plug 72 is inserted into a power supply socket 73, and the battery pack 3 is charged by a built-in charger 71.

In battery packs installed in the hybrid vehicles shown in FIGS. 10 to 15, it is desirable to set the nominal voltage to fall within a range of 200 to 600V.

The battery module systems according to the embodiments of the invention are suitable, in particular, for series/parallel hybrid vehicles.

In general, it is preferable to install the battery pack at a location at which the pack will not easily be influenced by changes in ambient temperature, and will not significantly be impacted when, for example, the vehicle collides with something. For instance, in sedan-type vehicles, the battery pack can be placed in the trunk located rearward of the back seats, or below or rearward of the back seats. When the battery pack is heavy, it is preferable to install the pack below the seats or below the floor in order to balance the center of gravity of the entire body of the vehicle.

Electric vehicles (EV) run with the electrical energy accumulated in the battery pack charged with electricity from the outside. Accordingly, they can utilize electrical energy generated highly efficiently by electricity generation facilities. Further, during deceleration, the motive energy of the vehicle can be regenerated as electrical power, and hence the energy efficiency during running can be enhanced. Since electrical vehicles do not discharge exhaust gases such as carbon dioxide, they are considered clean. However, all motive force used for running is generated by an electrical motor, which means that a high-output motor is needed. In general, it is necessary to accumulate, in their battery pack by one-time charge, all electricity necessary for one-time running, which means that a battery of a very large capacity is needed. Preferably, the rated capacity of the battery pack is set to fall within a range of 100 to 500 Ah, and more preferably, within a range of 200 to 400 Ah.

In addition, in EVs, the ratio of the battery weight to the overall weight of the vehicle is high, and hence it is preferable to install the battery pack at a low location, for example, below the floor, and at a location that is not far from the center of gravity of the entire body of the vehicle. To charge, in a short time, a great amount of electrical power that can cover one-time running, a large-capacity charger and charging cable are necessary. Accordingly, it is desirable to provide EVs with a charging connector for connecting the charger and cable. The charging connector may be a standard connector that utilizes an electrical contact, or a non-contact charging connector that utilizes electromagnetic coupling.

The present invention is applicable to a storage battery system used as a power supply for various machines that utilize electrical energy. In particular, it is applicable to on-vehicle power supply systems installed in hybrid vehicles or plug-in hybrid vehicles.

The storage battery systems of the present invention can efficiently charge during rapid charging such as regenerative charging, and can discharge during a low-load operation. When the storage battery systems of the present invention are installed in vehicles, an on-vehicle power supply system and vehicle with long-life battery performance can be provided.

The present invention is not limited to the above-described embodiments, but may be modified in various ways without departing from the scope. Various inventions can be realized by appropriately combining the structural elements disclosed in the embodiments. For instance, some of the disclosed structural elements may be deleted. Some structural elements of different embodiments may be combined appropriately.

What is claimed is:

1. An on-vehicle power supply system comprising: a storage battery system, the storage battery system comprising:
    a battery module A comprising a first nonaqueous electrolyte battery including a negative-electrode material which has an average grain size of 2 μm or more;
    a battery module B comprising a second nonaqueous electrolyte battery including a negative-electrode material which has an average grain size of primary particles of 1 μm or less and is configured to occlude lithium ions within a range of 0.4V (vs.Li/Li+) or more;
    a motor or dynamo configured to supply a power to the battery module B; and
    a controller configured to intermittently connect the battery module A to the battery module B to intermittently supply power from the battery module A to the battery module B by repeating cycles of charging the battery module B from the battery module A and non-charging, while setting a state of charge of the second nonaqueous electrolyte battery within a range of 10 to 90%, when the motor or dynamo is stopped,
    wherein when power is supplied to the storage battery system from the motor or dynamo, the controller intermittently causes the power from the motor or dynamo to be supplied to the battery module B, and causes the battery module A to supply power to the motor or dynamo, the power from the battery module A being lower than the power supplied to the battery module B.

2. The on-vehicle power supply system according to claim 1, wherein the controller connects the battery module A to the battery module B a preset number of times per 30 days to supply, the preset number falling within a range of 1 to 60 times, using a constant-voltage control scheme, power from the battery module A to the battery module B to set the state of charge of the second nonaqueous electrolyte battery within the range of 10 to 90%.

3. The on-vehicle power supply system according to claim 1, wherein the controller causes power to be supplied from the battery module B to the battery module A, using a constant-current control scheme and a constant-voltage control scheme, when the state of charge of the second nonaqueous electrolyte battery falls within a range of 50 to 100%.

4. The on-vehicle power supply system according to claim 1, further comprising an external power source connected to the battery module B to supply power thereto, wherein the battery module A is provided with the power supply from the external power source via the battery module B.

5. The on-vehicle power supply system according to claim 1, wherein the negative-electrode material of the second nonaqueous electrolyte battery includes a metal oxide containing titanium.

6. The on-vehicle power supply system according to claim 5, wherein the metal oxide contains a spinel-type lithium titanium oxide.

7. The on-vehicle power supply system according to claim 1, wherein the negative-electrode material of the first nonaqueous electrolyte battery contains a carbon material, a lithium alloy and a metal compound.

8. The on-vehicle power supply system according to claim 7, wherein the carbon material contains graphite powder acquired using natural graphite as a row material.

9. The on-vehicle power supply system according to claim 1, wherein the controller causes power to be supplied from the battery module A to the battery module B, using a constant-voltage control scheme, when the state of charge of the second nonaqueous electrolyte battery drops to 40% or less.

10. The on-vehicle power supply system according to claim 1, further comprising an inverter interposed between the motor or dynamo and the battery module B, the motor or dynamo connected to the battery module B to supply power thereto via the inverter, and then to the battery module A from the battery module B.

11. The on-vehicle power supply system according to claim 1, further comprising a plug connectable to an external power-supply socket, and a built-in charger interposed between the plug and the battery module B, the plug being connected to the power-supply socket to supply external power to the battery module B via the built-in charger, and then to the battery module A from the battery module B.

12. A vehicle comprising the on-vehicle power supply system according to claim 1.

13. The on-vehicle power supply system according to claim 1, wherein the controller connects the battery module A to the battery module B 1 to 60 times per 30 days.

* * * * *